(12) United States Patent
Chen et al.

(10) Patent No.: US 10,235,583 B2
(45) Date of Patent: Mar. 19, 2019

(54) ELECTRONICALLY SHREDDING A DOCUMENT

(71) Applicant: Captricity, Inc., Oakland, CA (US)

(72) Inventors: Kuang Chen, Oakland, CA (US); Hui Peng Hu, Berkeley, CA (US); Yoriyasu Yano, Oakland, CA (US); Nicholas Andre Jalbert, Berkeley, CA (US)

(73) Assignee: CAPTRICITY, INC., Oakland, CA (US)

(*) Notice: Subject to any disclaimer, the term of this patent is extended or adjusted under 35 U.S.C. 154(b) by 329 days.

(21) Appl. No.: 15/051,570

(22) Filed: Feb. 23, 2016

(65) Prior Publication Data

US 2016/0253504 A1 Sep. 1, 2016

Related U.S. Application Data

(60) Provisional application No. 62/126,124, filed on Feb. 27, 2015.

(51) Int. Cl.
*G06K 9/18* (2006.01)
*G06F 17/30* (2006.01)
*G06F 21/62* (2013.01)
*G06K 9/00* (2006.01)
*G06K 9/34* (2006.01)

(52) U.S. Cl.
CPC .......... *G06K 9/18* (2013.01); *G06F 17/30011* (2013.01); *G06F 21/6245* (2013.01); *G06K 9/00449* (2013.01); *G06K 9/342* (2013.01); *G06F 2221/2143* (2013.01); *G06K 2209/01* (2013.01)

(58) Field of Classification Search
CPC ....................................................... G06K 9/18
USPC ............................................................ 726/28
See application file for complete search history.

(56) References Cited

U.S. PATENT DOCUMENTS

| | | | | |
|---|---|---|---|---|
| 7,165,723 B2* | 1/2007 | McGlamery | ............. | G06K 9/03 235/379 |
| 7,392,533 B2* | 6/2008 | Ternasky | ................ | G06F 21/10 713/170 |
| 8,605,297 B2* | 12/2013 | Nielsen | .................... | G06K 9/00 358/1.11 |
| 8,832,853 B2* | 9/2014 | Clark | ..................... | H04L 51/12 709/206 |

(Continued)

*Primary Examiner* — Dant B Shaifer Harriman
(74) *Attorney, Agent, or Firm* — Perkins Coie LLP

(57) ABSTRACT

Disclosed are a method and apparatus for storing and/or digitizing documents that preserves the confidentiality of the documents. The technology includes a process, referred to herein as "shredding", that extracts portions of a digitized document, such as a scanned document or an image file, to create "shreds." A shred can be, for example, a field of a form, a portion of a photo, etc. In some embodiments where the source document includes confidential information, each individual shred does not include the confidential information and, with information of only one shred, a person cannot obtain the confidential information. As a result, while the source document needs to be stored in a secure fashion to prevent disclosure of the confidential information, the shreds can be stored in a non-secure fashion without risking disclosure of the confidential information.

19 Claims, 16 Drawing Sheets

(56) References Cited

U.S. PATENT DOCUMENTS

| | | | | |
|---|---|---|---|---|
| 2006/0075228 A1* | 4/2006 | Black | ............... | H04L 63/0428 |
| | | | | 713/167 |
| 2011/0081060 A1* | 4/2011 | Suwaki | ............... | G06F 19/321 |
| | | | | 382/128 |
| 2011/0276713 A1* | 11/2011 | Brand | ............... | H04L 67/1097 |
| | | | | 709/232 |
| 2014/0157434 A1* | 6/2014 | Graves | ............... | H04L 63/101 |
| | | | | 726/28 |
| 2014/0278426 A1* | 9/2014 | Jost | ............... | G10L 15/063 |
| | | | | 704/257 |
| 2014/0373176 A1* | 12/2014 | Arning | ............... | G06F 21/6218 |
| | | | | 726/28 |

* cited by examiner

Registration Form — 300

- 305 → Child's Name: _____  Child's Social Security #: _____
- Address: _____ Apt.# ____ City _____ State: ____
- Zip Code: _____ Home Telephone: _____ ← 310
- Date of Birth: _____ Place of Birth: _____
- Birth Certificate Number: _____
- Immunization Dates: Polio _____ DPT _____ Varicella _____
  HIB _____ HepB _____ MMR _____
- If Baptized: Date: _____ Church _____
- Church Address: _____

- Name of School or Pre-School Child Now Attends: _____
- Address: _____ Telephone: _____

- FATHER: Name _____ Date/Place of Birth _____
- Soc.Sec.# _____ Occupation _____ Work Tel. _____
- Company Name/Address _____

- MOTHER: Name _____ Date/Place of Birth _____
- Soc.Sec.# _____ Occupation _____ Work Tel. _____
- Company Name/Address _____

- Parents are: ___ married ___ single ___ separated ☐ divorced ← 315

- EMERGENCY NOTIFICATION: If parents cannot be reached, notify:
- Name _____ Tel.# _____ Relation to child: _____

- OTHER CHILDREN IN FAMILY. Please list name and date of birth of brothers/sisters, if any: _____

I HEREBY GIVE MY RELEASE AND CONSENT, IN CASE OF AN EMERGENCY, FOR MY CHILD TO BE TREATED BY A DOCTOR OR HOSPITAL EMERGENCY ROOM, IF I CANNOT BE REACHED AT HOME OR AT WORK.
Date: _____ Parent Signature _____

Child's Current Grade: ____ Principal Approval: _____ Date: _____

DMV

VERIFICATION OF VEHICLE
NOT TO BE COMPLETED BY APPLICANT

This form must be completed in full by an authorized DMV representative, California licensed vehicle verifier, authorized auto club, or peace officer who has been properly trained to perform vehicle verifications.

WARNING: Alterations or erasures will void this form. Your vehicle may also be subject to verification by the California Highway Patrol.

— 505

| LICENSE PLATES ON VEHICLE | | | LICENSE PLATE NUMBER | STATE | EXP. DATE |
|---|---|---|---|---|---|
| ☐ None | ☐ Dealer | ☐ Temporary Permit | | | |

| VEHICLE IDENTIFICATION NUMBER (VIN) |
|---|
| |

| ENGINE NUMBER (MOTORCYCLES ONLY) | MAKE | BODY TYPE | MODEL YEAR |
|---|---|---|---|

| AXLES | MOTIVE POWER (FUEL) | EST. WEIGHT (TRAILERS) | MODEL OR SERIES | NUMBER OF WHEELS | FOR CAMP/COACH |
|---|---|---|---|---|---|
| | | | | | LENGTH _____ WIDTH _____ |

*FIG. 5*

| Diagnosis | New Cases | Follow-up | Referrals | Deaths *PHU* | Deaths *Community* | Total |
|---|---|---|---|---|---|---|
| Malaria | | | | | | |
| Anaemia | | | | | | |
| All others | | | | | | |
| Diarrhoea With Blood (Dysentery) | | | | | | |
| Yellow Fever | | | | | | |
| Wounds/Trauma | | | | | | |
| Tetanus | | | | | | |
| Lassa Fever | | | | | | |
| Measles | | | | | | |
| Etc. etc. | | | | | | |

ELECTRONICALLY SHREDDING A DOCUMENT

CROSS-REFERENCE TO RELATED APPLICATIONS

This is a non-provisional application filed under 37 C.F.R. § 1.53(b), claiming priority under U.S.C. Section 119(e) to U.S. Provisional Patent Application Ser. No. 62/126,124, entitled "ELECTRONICALLY SHREDDING A DOCUMENT," filed Feb. 27, 2015, the entire disclosure of which is hereby expressly incorporated by reference in its entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc.

The information of these forms are often entered into databases, such as a database of the doctor, the DMV, or the new employer. The process of entering this information into databases or other storage medium can include digitizing paper documents, such as forms, and can involve producing text documents from scanned or photographed images of documents in paper or other analog format. Some documents that are digitized, such as medical records, are confidential and contain sensitive information. Exposing an entire document to a third-party, such as an employee or contractor of a third-party company, can risk the confidentiality of the documents.

BRIEF DESCRIPTION OF THE DRAWINGS

One or more embodiments are illustrated by way of example in the figures of the accompanying drawings, in which like references indicate similar elements.

FIG. 3 is an illustration of a blank school registration form, consistent with various embodiments.

FIGS. 4A and 4B are illustrations of a Department of Motor Vehicles (DMV) form, consistent with various embodiments.

FIG. 5 is an illustration of a blank DMV form, consistent with various embodiments.

FIG. 7 in an illustration of a disease data table, consistent with various embodiments.

FIGS. 8A-C are illustrations of documents depicting shreds, consistent with various embodiments.

FIG. 11 is an illustration of a blank school registration form that has been divided into rectangles, consistent with various embodiments.

DETAILED DESCRIPTION

Figure 1A:
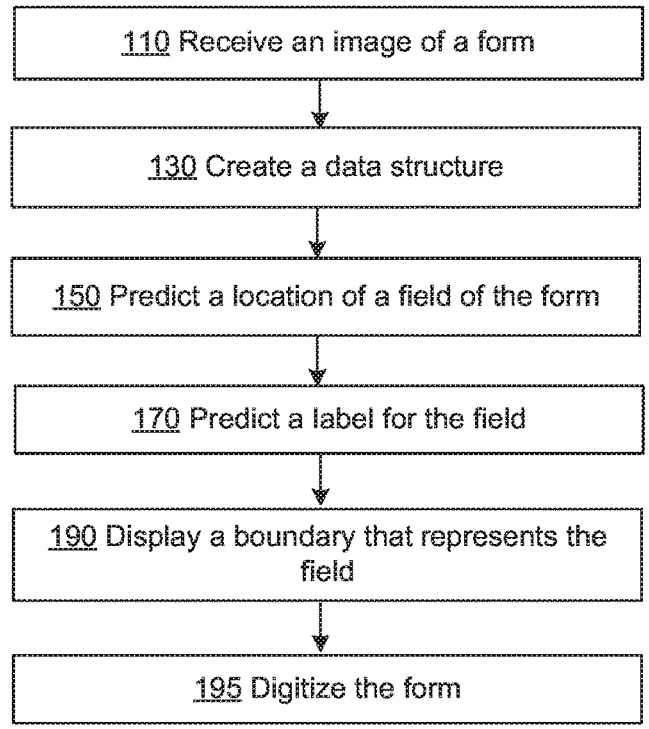
FIGS. 1A-D are flow diagrams that illustrate an example process for identifying a field on a form template based on an image of the form template, consistent with various embodiments.
Figure 1B:
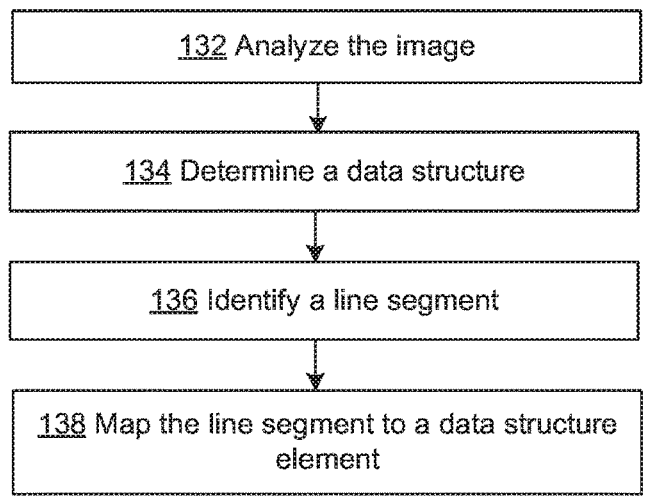
Figure 1C:
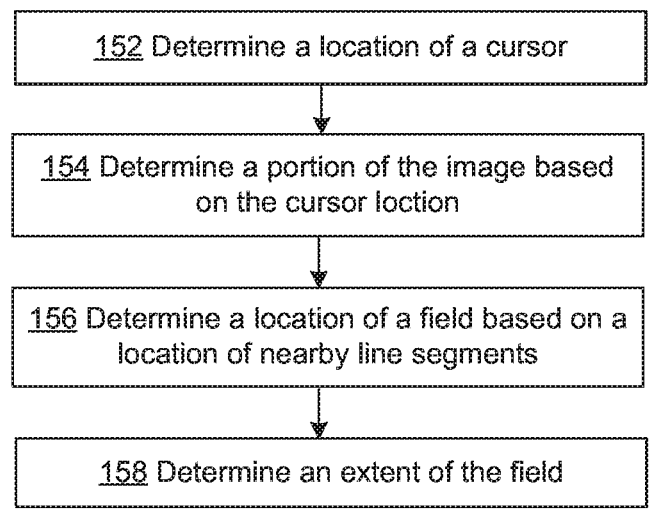
Figure 1D:
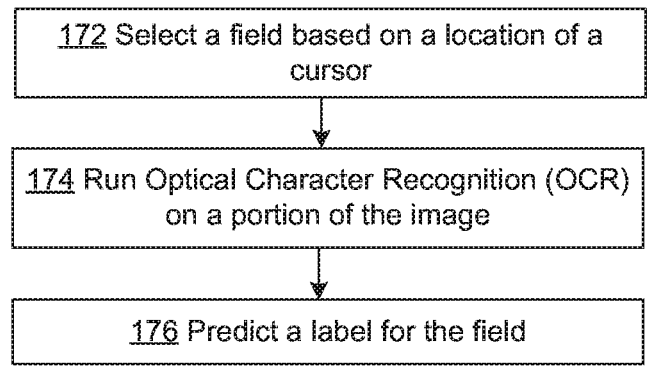

Introduced here is technology related to storing and/or digitizing documents that preserves the confidentiality of the documents. The technology includes a process, referred to herein as "shredding", that extracts portions of a digitized document, such as a scanned document. The extracted portions of the document are referred to herein as "shreds". A shred can be, for example, a field of a form, a word, a portion of a word, a letter or other character, a portion of a letter or other character, a portion of a drawing, a portion of a photo, etc. The combination of all shreds of a document can comprise the entire document, or a portion of the document less than the entirety.

A document can be shredded by a shredding platform running an application that includes a shredding algorithm. Shredding can be applied to any of a variety of documents. For example, shredding can be applied to form-based documents, documents that include text, drawings, photos, handwritten documents, etc., with automated algorithms.

Many documents contain confidential information. For example, a document can be a medical record that includes the confidential information that patient John Doe was diagnosed with cancer. In some embodiments, a shred, when considered in isolation (i.e., when considered absent knowledge of the contents of other shreds of the source document), does not contain sensitive/confidential information. For example, if four shreds of the medical record include images or text containing the characters 1) John, 2) Doe, 3) diagnosis, and 4) cancer, each shred considered individually does not include sensitive or confidential information because the fact that John Doe was diagnosed with cancer cannot be derived from any individual shred. However, when the shreds are all associated with the medical record or each other in a proper fashion, the combination of the shreds can contain the confidential information that John Doe was diagnosed with cancer.

A shred can be stored or represented in any of various ways. For example, when a shred is a word, the shred can be stored as a text string that represents the word, as a digital image of the word, etc. When a shred is a portion of a drawing, photo, etc., the shred can be stored as a digital image of the portion of the drawing, photo, etc. A digital image can be represented in any of various formats, such as a bitmap, a jpeg, etc. A shred can be encrypted or not encrypted.

A digital document can be shredded utilizing an algorithm that employs any of various techniques, such as crowdsourcing, machine learning, cloud computing, cloud storage, etc. Because a number of shreds can be extracted from a document, processing involving shreds is very amenable to parallel processing, processing utilizing multiple computers, etc. When a document includes confidential information and individual shreds of the document do not contain or divulge the sensitive information, the shreds can be stored without regard to security or privacy issues (as long as information as to how to locate and associate the shreds is securely stored). In some embodiments, a shredding algorithm ensures that no shred of a document contains sensitive information, such as by ensuring that no shred of a document contains more than one word or more than one field of information.

Once the document is shredded, the shreds can be stored in any desired fashion, such as in a non-secure fashion at a public cloud storage system, without risking a breach of the confidential/sensitive information of the source document. Being able to store shreds in a non-secure fashion simplifies enabling access to the shreds and has certain advantages. For example, the shreds can be stored in a non-secure fashion, which simplifies enabling the contents of the shreds to be processed by resources, such as humans or computers, without disclosing the confidential information of the source document. In some prior art solutions, to keep the contents of a confidential document secure, the document is stored at a secure network, or is stored encrypted. In such a case, before anyone or anything is able to process the information contained in the document, they/it need to gain access to the secure network, or gain access to the encryption codes/keys needed to decrypt the document.

Being able to store the shreds in an easily accessible fashion without disclosing the confidential information of the source document can help to simplify utilizing resources, such as humans or computers, to process information of the shreds. In one example, patients manually fill out forms when they visit a hospital for medical care. They write their name in a NAME field of the form, write a previous diagnosis in a PREVIOUS DIAGNOSIS field of the form, etc. The information of the form needs to be digitized and entered into a database for future reference by the hospital. A hospital employee scans the forms to create digital images of the forms, and the digital images are stored at a secure private network in the hospital. The digital images of the forms are then shredded by a server on the secure private network, and the shreds are stored at a public cloud storage system.

In this example each field of the form has an associated shred that includes an image of the field of the form. For example, a shred associated with the NAME field contains an image of the field where the person wrote their name, a shred associated with the PREVIOUS DIAGNOSIS field of the form contains an image of the field where the person wrote their previous diagnosis, etc. If some random person was able to view the contents of any one of the shreds, he would not be able to obtain the confidential information, which in this example is that the person was diagnosed with HIV. In viewing the contents of one of the shreds, the random person could know the name of the person, or could know that someone was diagnosed with HIV, but the random person would not know the confidential information, which requires knowledge of both the name of the person, and the fact that the person was diagnosed with HIV.

The shreds are next processed by computers of a public compute cloud, and OCR is attempted by the cloud computers. When OCR is successful with high confidence for a selected shred, a cloud computer stores the OCR'ed data in a file that is also at the public cloud, and that is associated with the selected shred. The data in the file is not sensitive for reasons similar to why the information of the shred is not sensitive, as discussed above. When OCR is unsuccessful, or is not high confidence, the selected shred is processed by a crowdsourced human resource, who visually views the image data of the selected shred and manually OCRs the image, which is an image of a filled in field of the form. The human resource inputs the OCRed data in the file associated with the shred. Once all the shreds have been successfully OCR'ed, either automatically or manually, the server of the secure network retrieves the OCR data from the public cloud and stores the OCR'ed data in the database in association with the fields of the form. For example, the result of OCR'ing the image data of the shred of the NAME field, the result being text representing the name of the person, is stored in the database associated with the NAME field of this particular form. Once all the OCR'ed data of all the shreds of the document have been input to the database, the digitization of the document and storage of the OCR'ed data at the database is complete.

FIGS. 1A-D are flow diagrams illustrating an example process for identifying a field of a form template based on an image of the form template, consistent with various embodiments. The process of FIGS. 1A-D can be used to identify fields of a form in preparation for, for example, extracting shreds of the form that are associated with the fields of the form. The process can also be used to identify fields of a form or a form template in preparation, for example, for generating a library of form templates, where the library includes or is associated with digitized representations of the form templates that include locations or identities/labels of fields of the form templates. A library of form templates can be referred to as a template form library. In some embodiments, a field or a portion of a field is a shred, and the process of extracting one or more shreds from a document can be referred to as shredding the document. In an example where a document is an image of a form, a shred is a portion of the document that corresponds to a field of the form. A process of extracting data from an image of a document that corresponds to a field can be referred to as extracting a shred of the document, and the process of extracting one or more shreds from the image of the document can be referred to as shredding the document.

A digitized representation of a form template that includes locations or identities/labels of fields of the form template can include both locations and identities/labels of the fields of the form template. Identifying a field of a form template can include identifying a location of the field on the form template, or identifying an identity/label of a field of the form template. The location of the field of the form can later be used, e.g., to extract a shred that corresponds to the field of the form, to extract a shred that corresponds to a portion of the field, etc. In an example where a user has filled out the form, which included writing data in the field of the form, the location of the field can be used to extract a shred that corresponds to the location of the field.

As discussed, FIGS. 1A-D relate to automatically identifying fields, such as fields of an image of a paper form. A brief overview of a an example or two may be helpful, and is presented. An image of a form, such as a paper form, can be obtained, for example, by scanning or photographing the form. A field is a space on a form for an item of information to be entered, such as by being written or typed in the field. In some embodiments, a field is additionally a space on a form that contains label information related to a table. A field can be a standalone field, a location in a table for placing data, a location in a table that contains text that identifies a row or column of a table, etc. Examples of fields include a name field, an address field, a driver's license number field, a social security number field, a comment field, a symptom description field, a date field, a signature field, a row one column one field in a table, a row two column five field in a table, a field of a table that contains text where the text is used as part of labels of fields in a row or column of the table, etc.

After a person fills out a form, which entails entering data/information in the various fields, the data/information often needs be to electronically captured and stored, such as in a database, spreadsheet, electronic document, etc. To improve the productivity of electronically capturing form data/information, it is desirable to automatically extract and capture information from a filled out form (i.e., a "completed" form).

In a first example process for digitizing a form, a user obtains an image of a form by scanning the form. The form is preferably blank, but in some embodiments can also be filled out. The user views the image of the form using a computer. The user uses a mouse to enter a first box that defines the bounds of a first field, uses the mouse to enter a second box that defines the bounds of a second field, etc. The "bounds" or "boundary" of a field is one way to define the "location" of the field. The user next provides an identify/label for each box. For example, the user selects the first box using the mouse, and enters "name" using a keyboard, thereby identifying/labeling the first box as the "name" field. The user next selects the second box and enters "phone number", thereby identifying/labeling the second box as the "phone number" field.

The form also includes a ten by ten data table. The user one by one selects boxes that represent the boundary/location of each of the one hundred fields of the data table, and types in the identity/label of each of the fields. For example, the user selects the row one column one field box and types "R1C1" to identify the field as the row 1 column 1 field. Once all of the fields of the form have been located and identified, the user, using the computer, creates a digitized representation of the form, which includes the locations and identities of all of the fields.

Once the form has been digitized, the information entered in the various fields can be automatically extracted from an image of a completed version of the form, e.g., to create shreds that correspond to fields of the form. In an example, a computer system obtains an image of a completed form by scanning the completed form. The computer matches and aligns the image with a digitized representation of the form. A process for visually classifying forms, which enables matching and aligning a form with a form library, is disclosed in USPTO application Ser. No. 14/713,863, which was filed on May 5, 2015, and which is hereby incorporated in its entirety. Once matched and aligned, the locations and identities of the various fields from the digitized representation of the form can be used to locate the corresponding fields on the completed form.

For example, (X,Y) coordinates of the "name" field box, or the "R1C1" field box, can be used to locate an area on the completed form where a person's name or the row one column one table data is expected to appear. Optical character recognition (OCR) can be run on an area of the form that is based on the field boundary, and the person's name or the row one column one table data can be automatically extracted based on the OCR results. In some embodiments, OCR is run by a local computer, and in other embodiments, is run by a remote computer. To facilitate parallel processing, remote processing, human processing, etc., in some embodiments, a shred or shreds are extracted for each of one or more fields of the form, and the shred(s) are made available for parallel processing, for remote processing, for human processing, etc. In an example, the boundary of a field is oversized by a predetermined amount, and a shred is extracted based on the oversized boundary. The shred is stored at a cloud storage system, and a computer of a cloud compute system runs OCR on the shred to determine text that appears within the shred. If OCR is not determined to be successful with high confidence, the shred is made available for analysis by a crowdsourced person to visually determine the text of the shred. The results of computer performed OCR or human performed OCR are made available to the host computer.

Further, because the digitized representation of the form includes an identity of each field, text entered in each field can be automatically stored in the proper location in a database entry. For example, a database entry can be created for a particular completed form. A person entered "John Doe" in the "name" field, and "2.0" in the "R1C1" field of this particular completed form. An OCR (automated and/or manual) of the "name" and "R1C1" fields of this particular completed form determined that the text in these field is, respectively, "John Doe" and "2.0". The computer system writes "John Doe" to the "name" field, and "2.0" to the "R1C1" field, of the database entry for this particular completed form.

In a second example, a user similarly obtains an image of a form by scanning the form. The form is preferably blank, but in some embodiments can also be filled out. The user views the image of the form using a computer. The user moves a cursor to a first field of the form, and the computer system automatically displays a predicted location of the field, including a bounding box that represents the boundary of the field. The computer system further predicts the field name/label based on text in the document. The user clicks on the field to indicate that he wants to digitize the field. In some embodiments, the user can interactively modify the size of the bounding box that represents the extent of the field, and can change the name/label of the field. Once finalized, the user can cause the field information (e.g., the bounding box coordinate, the bounding box location, the name/label of the field, etc.) to be written to a database.

The user now wishes to digitize a table of the form. The user depresses a click/select indicator of a mouse outside one corner of the table and moves the cursor to outside the opposite corner of the table, which causes a table indicator box to be drawn such that the box encloses the table. The computer system predicts the locations of fields of the table, as well as field names/labels for the fields. The user indicates that he wants to digitize the fields of the table. In some embodiments, the user can interactively modify the size of the bounding boxes that represent the extents of the fields of the table, and can change the name/label of the fields of the table. Once finalized, the user can cause the field information (e.g., the bounding box coordinates, the bounding box locations, the name/label of the fields, etc.) for fields of the table to be written to a database.

Returning to FIGS. 1A-D, at block 110, a computer system receives binary data that represents an image of a form template, such as image 300 of FIG. 3. The binary data can be created in any compatible manner, such as by scanning the form template, taking a photo of the form template, running an application program to access and generate an image of a form template (e.g., when the form template is a data file of an application program, such as a word processor application), etc. The binary data can be from a scanner, camera, etc. that is coupled to and/or integrated with the computer system, can be from a remote computer system, can be from a mobile device such as a smart phone or tablet, can be from an application program, etc. The remote computer can have a scanner, camera, etc. that is coupled to and/or integrated with the remote computer system, and that can be used to obtain an image of a form template based on a scan or photograph of the form template.

In some embodiments, the image includes meta-data that identifies visual data, such as meta-data that identifies locations of lines, fields in the form template, etc. In other embodiments, the image includes no meta-data that identifies visual data, such as locations of lines, locations and/or extents of fields in the form template, etc. In such embodiments, the process of FIGS. 1A-D advantageously is able to extract visual data from the image without relying on or needing meta-data that identifies or helps to identify the visual data.

At block 130, the computer system creates a data structure to represent the form template. In some embodiments, the data structure is structured to enable efficient location of fields based on interactive user input. In one example usage scenario, a user views an image of a form template during a process of digitizing the form template. When the user moves a cursor over a possible location of a field of the form template, the data structure is structured to enable a fast and efficient prediction and display of a possible field. Digitizing a form template can include storing data related to fields of a form template, such as locations of fields, boundaries of fields, labels of fields, etc., at a data structure to facilitate automated or semi-automated extraction of data written/typed/etc. at the fields of a filled-out version a form that is an instance of the form template. A label of a field can also be referred to as an identity of the field.

Figure 2:
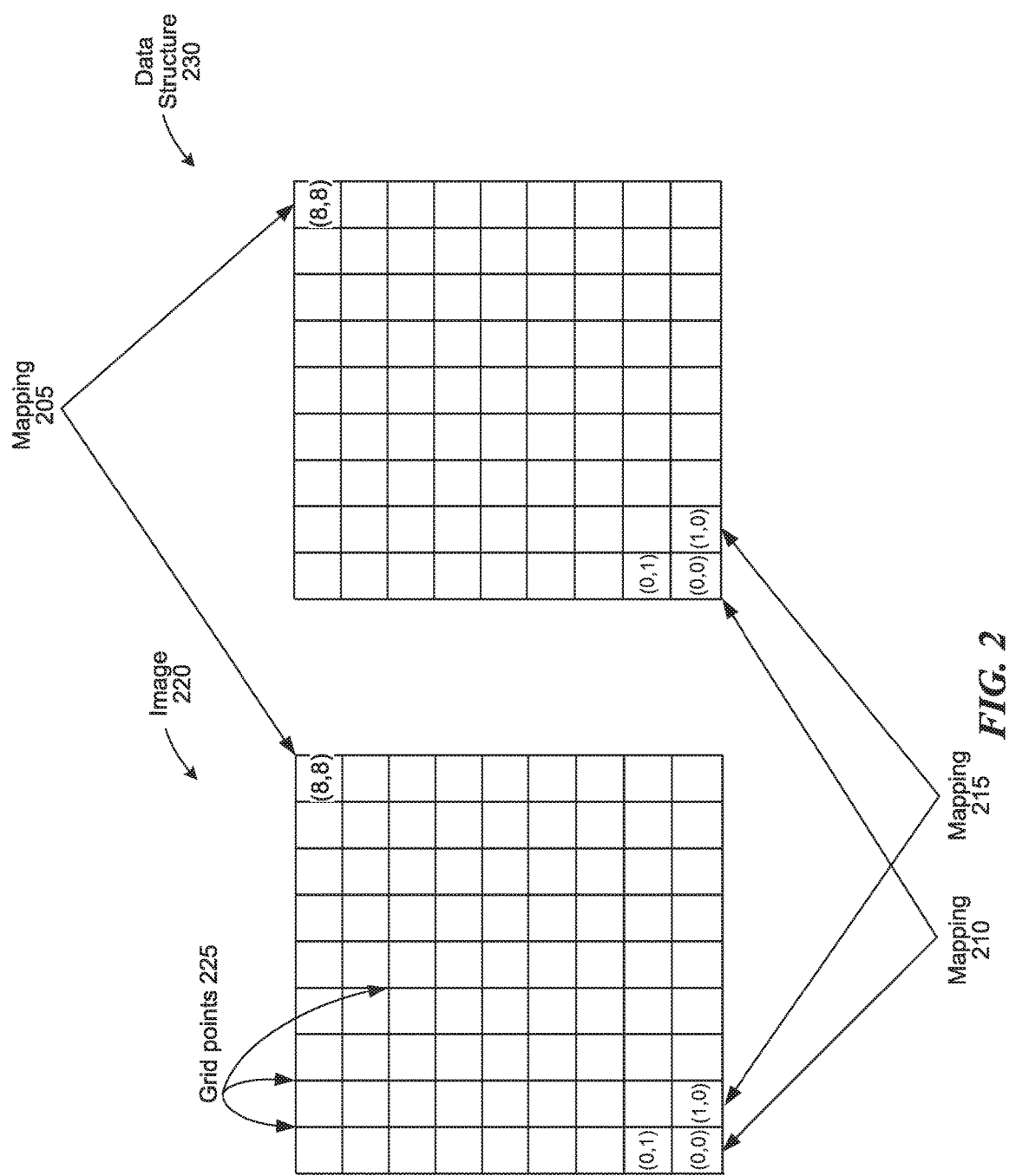
FIG. 2 is diagram that illustrates a mapping between an image of a form template and an associated data structure, consistent with various embodiments.

In some embodiments, the data structure is organized so that adjacent portions of an image map to adjacent elements of a data structure. For example, data structure 230 of FIG. 2 is organized so that adjacent "portions" of image 220 map to adjacent elements of data structure 230. Each square of image 220 represents a "portion" of image 220, and each square of data structure 230 represents an element of data structure 230. Each corner of each square of image 220, such as the square at index (0,0), or the square at index (8,8), is coincident with a grid of image 220. Grid points 225 identifies examples of three grids, also referred to as grid points. In some embodiments, each "portion" of image 220 is a shred of image 220.

As can be seen at mapping 210 and mapping 215, two adjacent "portions" of image 220 (e.g., portion (0,0) and portion (1,0)) map to adjacent elements of data structure 230 (e.g., element (0,0) and element (1,0)).

Blocks 132-138 represent a flow diagram to perform the operation of block 130. At block 132, the computer system analyzes the image of the form template. Features of a data structure can be determined by a computer system based on the analysis of the image. For example, features of a data structure, such as the number of elements of the data structure, the organization of the data structure, the data associated with each element, etc. can be determined based on an analysis of the image.

In some embodiments, the computer system determines a data structure based on a grid that the computer system determines based on the image of the form template. A grid can define the "portions" of an image. In FIG. 2 for example, grid points of image 220, such as grid points 225, define "portions" of image 220, where each non-overlapping square of image 220 represents one of the "portions" of image 220.

The computer system can determine the size of a grid based on an analysis of the image. For example, a grid can be set based on the size of a pixel of the image (e.g., grid=1 pixel×1 pixel), the size of a grouping of pixels of the image (e.g., grid=3×3 pixels), a measured portion of the image (e.g., grid=0.1 mm×0.1 mm), a percentage of a size of the image (e.g., the X grid=1% of the X dimension of the image, and the Y grid=1% of the Y dimension of the image), etc. When the grid is a pixel, one of the "portions" of image 220 includes data of the pixel that overlaps with one of the squares of image 220. When the grid is group of 3×3 pixels, one of the "portions" of image 220 includes data of the 9 pixels that overlap with one of the squares of image 220. Etc. In some embodiments, image 220 includes sensitive or confidential information, and the selection of the grid size is determined so that no portion of image 220, or shred of image 220, contain any information that, in isolation of the other portions or shreds of image 220, will disclose sensitive or confidential information of image 220 that is desired to be protected. In one example, image 220 is a photo of a government informant for a criminal prosecution, and the identity of the government informant is confidential. The size of the grid can be determined such that facial recognition techniques or algorithms are not able to identify the government informant based on any single portion or shred of image 220.

While the current discussion focuses on a regular grid whose grid points define squares, a grid can have various characteristics that are determined based on any of various other data. For example, a grid can define a set of non-overlapping rectangles, such as when the grid is 2 pixels by 1 pixel. As another example, the grid can be irregular. For example, the grid of FIG. 7 can be coincident with the line intersections of FIG. 7, where the lines and associated line intersections are irregularly spaced.

The computer system can determine a data structure (block 134) based on results of the analysis of block 132. In some embodiments, the computer system determines the data structure to enable data of each "portion" of the image to map to a different element of the data structure, and to enable adjacent "portions" of the image map to adjacent elements of the data structure. Data structure 230 of FIG. 2 is an example of such a data structure.

The computer system can determine any of various types of data structures, such as a linked list, an array, a hash table, a database, etc. Further, the data structure can be based on any of various attributes of the image, such as the color(s) of the image, the size of the image, the resolution of the image, etc.

In some embodiments, two elements of a data structure are considered to be adjacent when the index of each of the elements differs by one unit. For example, in data structure 230, the index is an ordered pair. For data structure 230, two elements are considered adjacent when one number of the ordered pair differs by one unit, and the other number of the ordered pair is the same. For example, element (0,0) is adjacent to element (1,0) because one number of the ordered pair (the first number in this example) differs by one unit, and the other number of the ordered pair is the same. Similarly, element (0,0) is adjacent to element (0,1) because one number of the ordered pair (the second number in this example) differs by one unit, and the other number of the ordered pair is the same.

As discussed above, the data structure can be organized so that the relative locations of the "portions" of the image are reflected in the organization of the data structure. When a document, such as a form template, is scanned, photographed, etc., the resulting image has a certain resolution. For example, the resolution of the image can be 2048 pixels by 1536 pixels, for a total of 3,145,728 pixels (or 3.1 Megapixels). In some embodiments, the computer system determines the grid size so that the grid matches the size of a pixel. In such an embodiment, each pixel of the image is associated with a particular row and column of the 2048 pixel×1536 pixel image of the form template. In this example, a pixel located at numbered pair (0,0) is located at the bottom-left of the image, and a pixel located at (2047, 1535) is located at the top-right of the photo. As is shown in FIG. 2, adjacent portions (0,0) and (1,0) of image 220 map to adjacent elements (0,0) and (1,0) of data structure 230. When the portion is a pixel, adjacent pixels (0,0) and (1,0) of the image map to adjacent elements (0,0) and (1,0) of the data structure.

At block 136, the computer system identifies a line segment. Some algorithms for predicting fields in a form template use locations of lines on the form template to predict or determine a location of a field, and a boundary of the field. The location of the field is where the field is located on the image of the form template. The location can be any location associated with the field, such as the location of the middle of the field, the bottom left corner of the field, the location of a line that defines a boundary of the field, such as a bottom line of a field, etc. The boundary of the field defines an area on the image where a user is expected to input (e.g., write, type, etc.) a value for the field.

Some embodiments of the process of FIG. 1 are interactive, in that user input is required during the process. In preparation for an interactive session, a computer system can pre-populate a data structure with data derived from an image to be digitized to enable a faster and more efficient interactive user experience. Some embodiments advantageously load data of the form template in memory in preparation for an interactive session. Loading the data of the form template in memory, such as by loading a data structure that contains data of the form template, and organizing the data to efficiently support an interactive session, can enable a much faster and responsive interactive user experience.

Some embodiments of the process of FIG. 1 use locations of line segments of the form template in predicting or determining field locations and boundaries. In order to facilitate an improved interactive user experience, qualifying line segments can be stored in a data structure that is organized/structured to efficiently support an interactive session. Returning to block 126, in some embodiments, the computer system identifies all visible line segments of a form template that meet a certain criteria. The computer system does this by analyzing the binary data of the image of the form template to identify line segments that are visible on the form template. Identifying line segments is well known in the art, with one example of an algorithm for doing so being a Hough Line Transform, which can be found at http://docs.opencv.org/doc/tutorials/imgproc/imgtrans/ hough_lines/hough_lines.html (an archive copy of which is available at https://web.archive.org/web/20150210104025/http://doc- s.opencv.org/doc/tutorials/i mgproc/imgtrans/ hough_lines/hough_lines.html). A second example of a line extractor can be found at http://docs.opencv.org/master/db/d73/ classcv_1_1LineSegmentDetector.html (an archive copy of which is available at https://web.archive.org/web/20150711073207/http://docs.o- pencv.org/master/db/d7 3/classcv_1_1 LineSegmentDe- tector.html).

As line segments are found, they can be evaluated to determine if they meet certain criteria. For example, lines that do not extend a pre-determined distance may be filtered out, lines that do not run sufficiently or substantially straight in the X or Y dimension may be filtered out, lines that are or are not of a certain color or color range may be filtered out, lines that are or are not of a certain style (such as a dashed line) may be filtered out, etc. In some embodiments, a line is deemed to run sufficiently straight when its length in the primary direction in which the line runs is at least 600% of the length that it traverses in the non-primary direction. For example, a line that extends 3 inches in the X dimension may be filtered out if the difference between the maximum and minimum Y coordinates of the line segment is more than 0.5 inches.

In some embodiments, once a line segment is determined and passes all line segment filters, the line segment is mapped to a data structure element (block 138). As discussed above, data of a "portion" of an image that is determined based on a grid can be mapped to an element of a data structure. Once the line segment is determined, the computer system determines which "portions" of the image the line passes through, and maps the line to the elements that are mapped to those "portions." For example, where the grid is a pixel and a line runs through 1000 pixels, the line can be mapped to each of the 1000 pixels. The data stored at each element can include, e.g., a link to a data structure element that includes the data of the line segment, information regarding the portion of the line segment that passes through the portion of the image that maps to the element, etc.

In some embodiments, this process is repeated for all line segments of the form template, such that, once completed, the data structure includes line segment information for all line segments that met the criteria and were not filtered out. Once the process is complete, the data structure of such embodiments includes information regarding all the line segments that meet the criteria, thereby advantageously enabling an enhanced interactive user experience.

At block 150, the computer system predicts a location of a field of the form template. Any computing device, such as a remote computer system, a mobile device, etc. can be used to perform the operation of block 150. A mobile device can be any mobile computing device, such as a laptop computer, a smart phone, a tablet, etc. In some embodiments, the operations of all blocks of FIG. 1 are performed by a computer system. In other embodiments, the operations of blocks 110-138 are performed by a server, and the operations of blocks 150-195 are performed by a computing device, such as a laptop computer, a desktop computer, a smart phone, a tablet, etc. In other embodiments, various computers perform the operations of the various blocks of FIG. 1A-D.

Blocks 152-158 represent a flow diagram to perform the operation of block 150. At block 152, a computer system determines a location of a cursor. In some embodiments, when a user begins an interactive session to digitize a form template, the user views an image of the form template. The image of the form template can be displayed by any of various applications that can display images, such as an image viewer, a photo viewer, a PDF viewer, a web browser, a word processor, etc. The process of digitizing the form template includes identifying relevant fields of the form template that a user may want to automatically extract from a filled-out form that is an instance of the form template. The user guides a cursor over a field, in this example field 305 of FIG. 3.

When the cursor hovers over and/or stays substantially at a selected location on the image, the computer system determines the location of the cursor, such as the location of the cursor on the image. Based on the location of the cursor, the computer system determines a "portion" of the image (block 154). The "portion" of the image can be a portion of the image that is located at the location of the cursor. For example, when the grid of image 300 of FIG. 3 is a pixel and the user hovers a cursor over field 305, the computer system determines the coordinate of the cursor. Based on the coordinate of the cursor, and based on the size of the grid (in this example, a pixel), the computer system determines that the coordinate of the cursor intersects a particular pixel of the image (i.e., the pixel being the "portion" of the image). In various embodiments, the portion of the image that is determined at block 154 can be a grid, multiple grids, part of the image that is within a defined distance the location of the cursor, etc.

At block 156, the computer system determines a location of a field based on a location of nearby line segments, and at block 158 determines an extent of the field. In a first example, a field is encircled by line segments. An example of such a field is field 405 of FIG. 4A, where a user would enter the "MAKE" of an automobile on a DMV form. As discussed above, the location of the field can be any location associated with the field, such as the location of the middle of the field, the bottom left corner of the field, the location of a line that defines a boundary of the field, the location of an extent of the field, etc.

In this example, the location of the field is the location of the line segment at the bottom of the field. Further, the data structure of block 130 is organized so that adjacent portions of an image map to adjacent elements of a data structure to enable a fast and efficient prediction and display of a possible field. In other words, when a first "portion" of the image is located "below" a second "portion" of the image, the element that maps to the first portion will be "below" the element that maps to the second portion. For example, in FIG. 2, the portion of image 220 at index (0,0) is "below" the portion of image 220 at index (0,1). Accordingly, the element of data structure 230 at index (0,0) is also "below" the element at index (0,1).

Based on the cursor location of block 152, and the associated "portion" of the image, the computer system accesses a data structure element associated with the "portion" of the image to determine if the element is mapped to a line segment. In this example, when the element is mapped to a line segment, the location of the line segment is determined and the location of the field is based on the location of this nearby line segment (block 156). The location of the field can be based on or can be any location characteristic of the line segment, such as a coordinate of a predetermined point on the line segment (e.g., the middle, left end, right end, etc. of the line segment), a location of the line segment, a location of the "portion" of the image that maps to the line segment, etc.

When the element is not mapped to a line segment, the computer system begins walking "down" elements of the data structure to find a line segment that is "below" the element. In this example, the index of an element of the data structure has the format index(X,Y). The computer system can walk "down" elements of the structure by decrementing Y. For example, if the starting element has an index of (1000,900), the next element when walking "down" elements of the data structure will have an index of (1000,899). As the computer system walks down elements of the data structure, it determines whether the next lower element maps to a line segment. If not, the computer system continues to the next lower element. Once the computer system identifies an element that maps to a line segment, the computer system in this example determines the location of the line segment and bases the location of the field on the location of this nearby line segment (block 156).

Once the "lower" line segment is identified, the computer system determines an extent of the field (block 158). In this first example, the computer system walks "up" elements of the data structure until it finds a line segment "above" the lower line segment. The computer system then walks "left" and "right" until it finds line segments that are "left" and "right" of the starting element. When the four line segments form a box, the extent of the field is based on the four line segments. For example, the extent of the field can be defined as the box formed by the four line segments, or by taking the box formed by the four line segments and over sizing or under sizing the box, of selected edges of the box, to determine the extent and/or boundary of the field.

In a second example, a field is bounded on two or three sides by line segments. Examples of such fields include fields 410 and 415 of FIG. 4A. In such examples, the location of nearby line segments and the location of the field are determined in a manner similar to the first example (block 156). However, when searching in a direction where the field is not bounded by a line, no line is found. When the computer system is in the process of determining the extent of the field (block 158), each discovered bounding line determines an extent of the field in one dimension. The extent of the field in directions where no bounding line was discovered is determined based on the end points of the bounding lines. For fields 410 and 415, the left extent is set to be coincident to the left ends of the top and bottom bounding line segments. For field 415, the right extent is similarly set to be coincident to the right ends of the top and bottom bounding line segments.

In a third example, a field is bounded on one side by a line segment. An example of such a field is field 305 of FIG. 3. In such an example, the location of nearby line segments and the location of the field are determined in a manner similar to the first example (block 156). However, when searching in a direction where the field is not bounded by a line, no line is found in that direction. When determining the extent of such a field (block 156), a computer system can set the left and right ends of the field to be coincident with the left and right ends of the discovered bounding line segment, or can set the ends to be a predetermined distance (positive or negative) from the ends of the discovered bounding line segment. The predetermined distance can be different for each end, and can be based on local characteristics. For example, when an end of a line segment is not near any other lines/text/etc, as is the case for the right end of the line segment that defines field 310, the predetermined distance can be set to a larger value, since there is no other lines/text in that extended area. When the end of a line segment is near, for example, adjacent text, such as the left end of the line segment that defines field 310, the predetermined distance can be set to a smaller value, so as to prevent the area of the field from extending to include the adjacent form text.

The top of the extent of the field can be determined in any of several ways. For example, the height can be determined based on the height of text that is associated with the field. For field 305, the top extent of the field can be set based on the text to the left of the field, "Child's Name," which is the text associated with field 305. The height of the field can be set equal to the height of the associated text, can be set to be a multiple of the height of the associated text (e.g., 1.5 times the height of the associated text), etc. As another example, the height can be determined based on the average or median height of text in the document. For example, the height of the field can be set equal to the median or average height of text in the document, can be set to be a multiple of the median or average height of the text in the document (e.g., 1.5 times the height of the median or average text height), etc.

In a forth example, a field includes extraneous line segments. An example of such a field is field 505 of FIG. 5. Field 505 includes line segments to denote where each character should be placed. In such a case, a detected nearby line segment can be filtered based on certain criteria. The filtering can happen prior to block 156. For example, when the line segments that form the top and bottom extents of field 505 are located, the Y dimension distance between the two line segments can be determined. When searching for line segments in the left or right direction, any detected vertical line segments that have a length less than a predetermined portion of the distance between the top and bottom extent line segments, such as 25% or 50% of the distance, can be filtered. Once the extraneous line segments are filtered, field 505 is determined in a manner similar to field 415.

In a fifth example, a field is bounded on one side by a line segment, and on an opposite side by one or more line segments whose lengths are different than or are offset from the boundary line segment of the first side. Examples of such fields include fields 310 and 315 of FIG. 3. In such cases, where one or more line segments are found in the vertical direction (block 156) which do not match the length and/or do not line up with the bottom line segment (e.g., the upper line segment is the same length, but is shifted in the left or right directions as compared to the bottom line segment), any of various techniques can be used to determine the upper extent of the field (block 158). For example, the upper extent of the field can be determined in a manner similar to the third example where the extent is based on the height of text in the document. As another example, the upper extent of the field can be set to be coincident with or offset from the line segment(s) found in the vertical direction, or to be coincident with or offset from the lowest line segment found in the vertical direction. When determining whether two line segments have the same length, or are shifted, the comparison between the line segments can include an error threshold, which can be a predetermined absolute amount, can be a predetermined relative amount, etc. For example, the error threshold can be 0.1 inches, can be 10% of the length of the line segment, etc.

In a sixth example, multiple fields are bounded on the top and bottom by line segments that extend the length of the multiple fields, and are not bounded on the left or right. An example of such a field is field 420 of FIG. 4A, which is bounded on the top and bottom by line segments that extend past the fields for APPLICANT'S SIGNATURE, for PRINTED NAME, and for DATE. In such a case, a computer system can determine the left and right extent of each field based on text associated with the fields or by the ends of the top and bottom boundary line segments (block 158). For example, a computer system can determine that multiple text fields are associated with the top and bottom boundary line segments based on spacing between the text. A computer system can evaluate the space between words, and when space between some words associated with a line segment or field exceeds a predetermined threshold, the computer system can determine that the large spacing indicates a new field. The threshold can be an absolute amount (e.g., a spacing more than 0.25 inches in the original image or when printed), can be a relative amount (e.g., a spacing more than two times the height of the text, more than 6 times the median spacing between words, etc.), among other amounts. Line segments 425-440 of FIG. 4B are examples of line segments that represent the left and right extents of the multiple fields of field 420.

In a seventh example, a field is part of a table. Examples of such fields include fields 605 and 620 of table 600 of FIG. 6, and field 705 of table 700 of FIG. 7. In such cases, a table can be automatically or semi-automatically detected. When tables 600 or 700 are automatically detected, a user can place a cursor over a field of the table, such as field 605 or field 705, and a computer system can determine the location of the cursor (block 152). The computer system can determine a portion of the image based on the cursor location (block 154) in a manner similar to some of the above examples. When determining a field based on locations of nearby line segments (block 156), which can be done in a manner similar to the first example where the field is encircled by line segments, a computer system can continue to search in the upper, lower, right, and left directions and can determine, based on the location of detected line segments, that field 605 is part of table 600, or that field 705 is part of table 700. For example, when the computer system searched in the right direction, the computer system can detect a series of similarly sized line segments. By doing similar searches in the left, upper, and lower directions the computer system can detect other line segments of the table in a similar manner, and, based on the detected line segments, can determine a location and extent of the table.

When tables 600 or 700 are semi-automatically or interactively detected, a computer system can receive input from a user that indicates an existence and location of the table. For example, when determining a location of a cursor (block 152), a computer system can also determine that a user drew a box with a mouse or other device to indicate a table. For table 600/700, a user can click slightly below and to the left of the bottom left corner of table 600/700 (e.g., below and to the left of field 615/715), can continue to depress the click indicator while moving the cursor to slightly above and to the right of the top right corner of table 600/700 (e.g., above and to the right of field 610/710), where he releases the click indicator, thereby indicating a first and a second corner of a rectangle that indicates an extent of a table, in this example table 600/700. The computer can analyze line segments that are within the indicated drawn bounding rectangle to determine both the location and extent of table 600/700, as well as the location and extent of each of the fields of the table, such as field 605/705 (blocks 156 and 158). In table 600/700, each field is encircled by line segments, and the location and boundary of field 605/705 can be determined in a manner similar to the first example where a field is encircled by line segments.

In some embodiments, X and Y dimensions of table 600/700 are determined, and lines that run less than a predetermined amount, such as 75% of a table dimension, are filtered. For example, if a line runs in the X dimension less than 75% of the X dimension of the table, or if a line runs in the Y dimension less than 75% of the Y dimension of the table, the line can be filtered out.

At block 170, a computer system predicts a label for the field. Blocks 172-176 represent a flow diagram for performing the operation of block 170. A computer system can select a field based on a location of a cursor on the image of the form template (block 172). The location of the cursor at block 172 can be the same location of the cursor at block 152, or can be a different location, for example, due to the cursor moving slightly. The field can be the field of block 156. The computer system can run OCR on part or all of the image to determine text of the image (block 174). Alternately, or in addition, using a method described below at FIG. 10, images of fields, or shreds, can be OCr'ed by remote processing resources. For example, the shreds can be copied to a cloud storage system, and a resource, such as a computer of a cloud computing system, a crowd sourced human, etc., can OCR the image of the shred to determine the text of the image. When OCR is done interactively, such as by a local computer, OCR can be run on the contents of a field when a user indicates a selection of the field, can be run on the entire document during creation of a data structure at block 130, or can be run at any of various other times. The contents of the field can be defined by the extent of the field as determined at block 158, by under sizing or over sizing the extent of the field of block 158, e.g., over sizing the extent of the field by 50% of the height of the field, or by another method.

A label for a field can be predicted in any of various ways (block 176). For example, the label can be predicted based on text that is located nearby to or at the field. As an example, prediction of labels for fields 305 and 310 of FIG. 3 can be based on an analysis of text/field patterns in a row of image 300 that includes the field. A computer system can determine that the text CHILD'S NAME is followed by field 305, which is followed by CHILD'S SOCIAL SECURITY #, which is followed by another field. The computer system, based on this pattern of text/field/text/field, can predict that the first text (i.e., CHILD'S NAME) is a label for the first field (i.e., field 305), and that the second text is a label for the second field.

As another example, a prediction of the label for field 315 can be similarly based on an analysis of text/field patterns in a row of image 300. A computer system can determine that the text PARENTS ARE: is followed by a first field, which is followed by MARRIED, which is followed by a second field, which is followed by SINGLE, which is followed by a third field, which is followed by SEPARATED, which is followed by a forth field, which is followed by DIVORCED. In this example, with there being text to both the left and right of each field, the computer system can additionally base a prediction of a label for a field on text punctuation. In this case, based on the first text ending in a colon (i.e., ":"), the computer system can predict that the text that follows each field is the label for the field, and that the label for field 315 is DIVORCED.

Figure 4A:
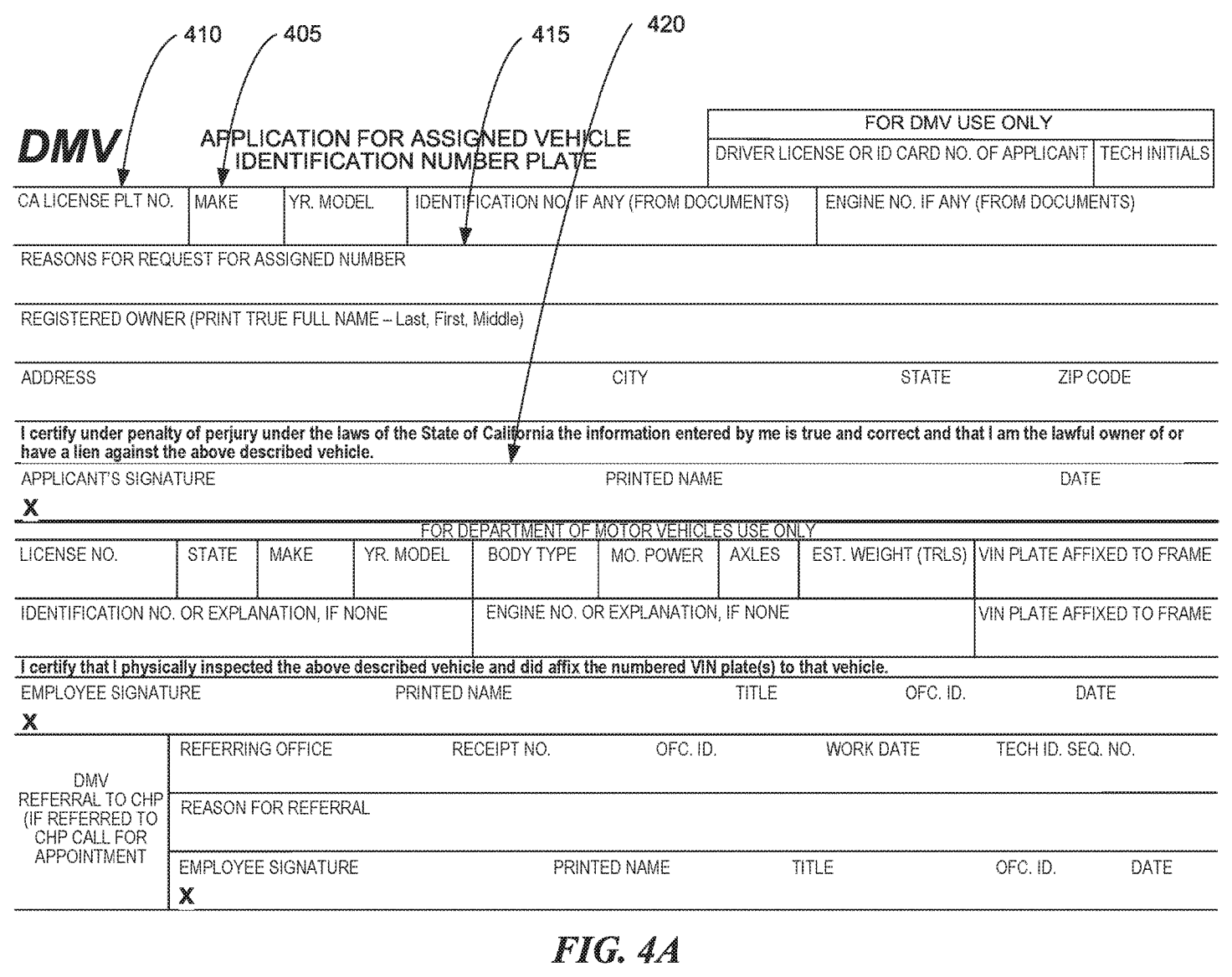
Figure 4B:
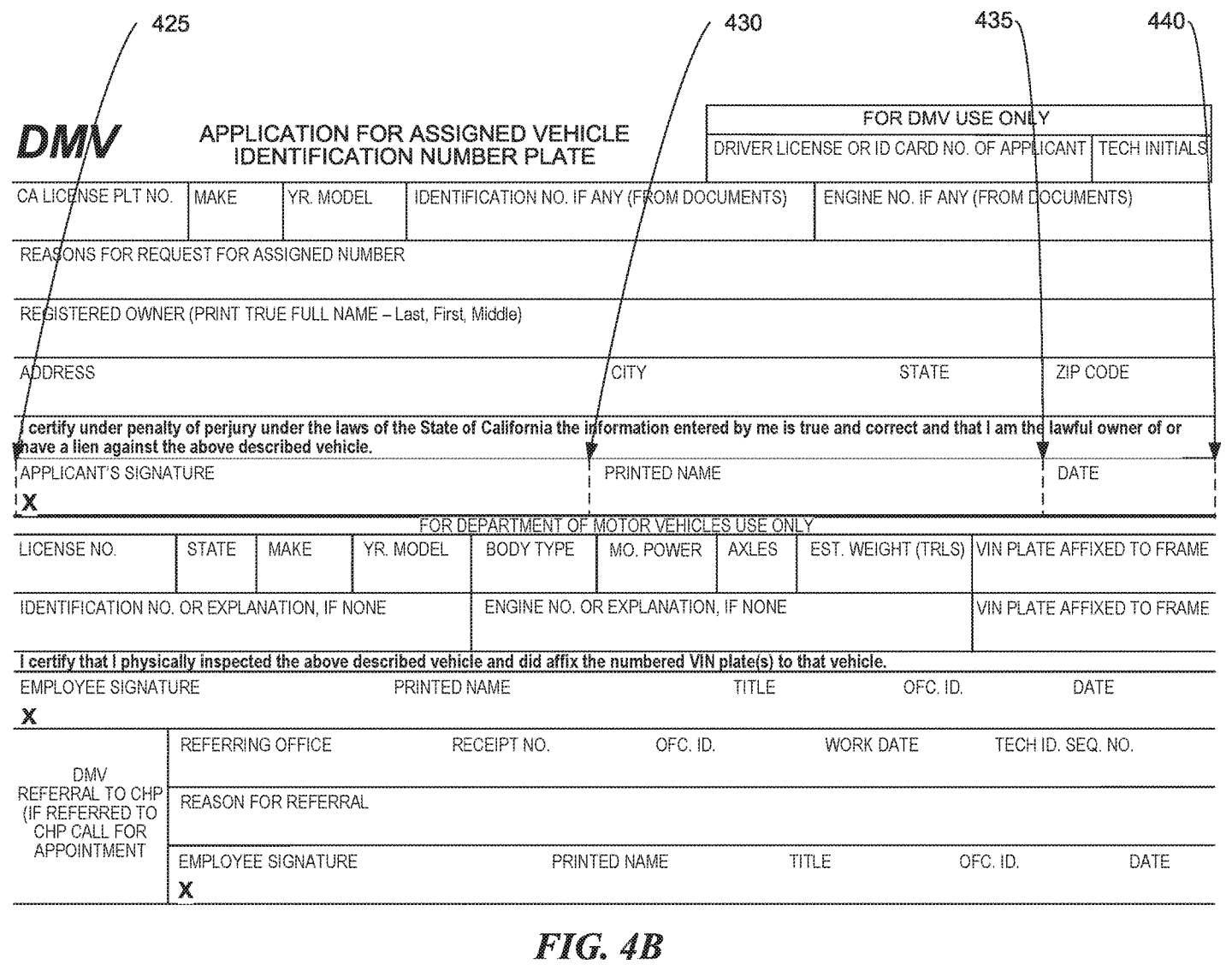

As yet another example, a prediction of the label for field 405 of FIG. 4A can be based on text that is located within the bounds of the field. A computer system can determine that the text MAKE lies within the boundary of field 405, and can predict that MAKE is the label for field 405. The bounds/boundary of the field can be defined by the extent of the field as determined at block 158, by a sizing of the extent of the field of block 158, or by another method. As yet another example, a prediction of a label for field 420 of FIG. 4A can be based on text that is located within the bounds of the multiple fields of field 420, as is represented by line segments 425-440 of FIG. 4B. In this example, a label for the first of the multiple fields of field 420 is APPLICANT'S SIGNATURE, a label for the second of the multiple fields is PRINTED NAME, and a label for the third of the multiple fields is DATE.

Figure 6:
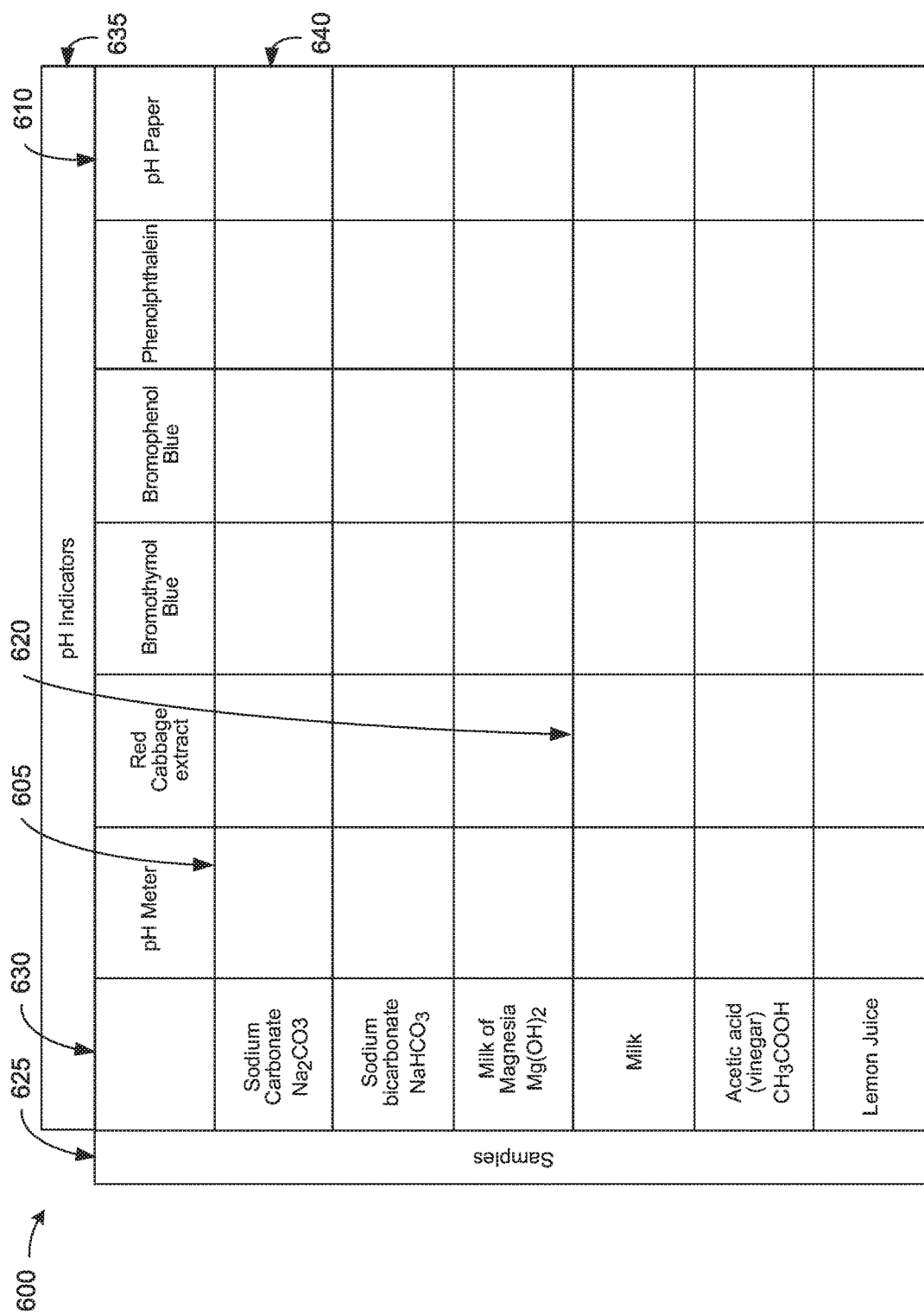
FIG. 6 is an illustration of a pH Indicator table, consistent with various embodiments.

A label for a field in a table, such as fields 605 or 620 of table 600 of FIG. 6, or field 705 of table 700 of FIG. 7, can be based on text in the outermost row(s) and column(s) of the table. In the example of FIG. 6, area 625, which includes the text SAMPLES, and area 635, which includes the text PH INDICATORS, are not part of table 600. The line segments that define the extents of areas 625 and 635 and do not define the extent of table 600 (i.e., the "625/635 line segments"), are not part of table 600 in this example and can be filtered in any of several ways. For example, when a user draws a box using a mouse or other device to indicate a table, the user can draw the box so that it does not include the entirety of areas 625 and 635. A computer system can filter the 625/635 line segments based on their not being fully contained within the drawn box.

In another example, a user draws the box so that it includes all of areas 625 and 635. In this example, a computer system can filter the 625/635 line segments based on the Y-dimension of area 625, and the X-dimension of area 635, not matching the X and Y dimensions of fields of table 600. In other words, the computer system can analyze fields that it finds within the drawn table indication box. When the computer system finds a number of abutting fields that are laid out in a table configuration, it can keep those fields, and it can filter out fields that do not match the table pattern. In this example, the 625/635 line segments that define boundaries of area 625 will be filtered out due to the Y dimension of area 625 not matching the Y dimension of fields of table 600. Additionally, the 625/635 line segments that define boundaries of area 635 will be filtered out due to the X dimension of area 635 not matching the X dimension of fields of table 600. This filtering will leave line segments that form the boundaries of the fields that form the rows and columns of the table.

Contents of fields that are in the outermost row(s) and column(s) can be analyzed to predict labels for the fields of table 600 (block 176). A computer system analyzes table 600 and determines that fields of the left most column and top most row of table 600 include text. The computer system can base the labels of the fields of table 600 on the text found in these fields. For example, a label of field 605 can be set to "PH METER" "SODIUM CARBONATE NA2CO3", with "PH METER" being predicted as part of the label for all fields in column 630 that are below the top most row, and with "SODIUM CARBONATE NA2CO3" being predicted as part of the label for all fields of row 640 to the right of the left most column. As a second example, a label of field 620 can be "RED CABBAGE EXTRACT" "MILK OF MAGNESIA MG(OH)2".

Labels for fields of table 700 are handled in a manner similar to the fields of table 600. In the example of FIG. 7, a label of field 705 can be set to "NEW CASES" "MALARIA", with "NEW CASES" being predicted as part of the label for all fields in column 720 below the top-most row of table 700, and with "SODIUM CARBONATE NA2CO3" being predicted as part of the label for all fields in row 725 to the right of the left most column of table 700.

At block 190, the computer system displays a boundary that represents the field. The boundary can be the extent determined at block 158 of FIG. 1C, can be the extent oversized or undersized by a predetermined amount, etc. For example, the boundary can be determined by oversizing the extent of the field by 0.25 inches, by undersizing the extent of the field by 10% of the height of the extent, etc. The boundary can be displayed in response to the user placing the cursor at a location of the field, by the user hovering the cursor or keeping the cursor substantially still over the field, etc.

At block 195 the user digitizes the form template. Digitizing a form template can include, for example, storing data related to fields of a form template, such as locations of fields, boundaries of fields, labels of fields, etc., at a data structure, such as to facilitate automated or semi-automated extraction of data written/typed/etc. at the fields of a filled-out version of a form that is an instance of the form template.

The data structure can be the data structure of block 130, or can be another data structure. For example, the computer system can create a data structure element for a field, such as for field 305 of FIG. 3. The data structure element can include members. For example, as part of digitizing the form template, the computer system can create members of the data structure element. For example, the computer system can create a member that defines the boundary of the field, another member that defines the field label, another memory that stores the location of the field, etc. The data structure of block 195 can be stored to disk for future use, such as when a filled-out version a form that matches the form template is received and the filled-out values of the various fields are extracted from the form and added to a database.

Figure 8A:
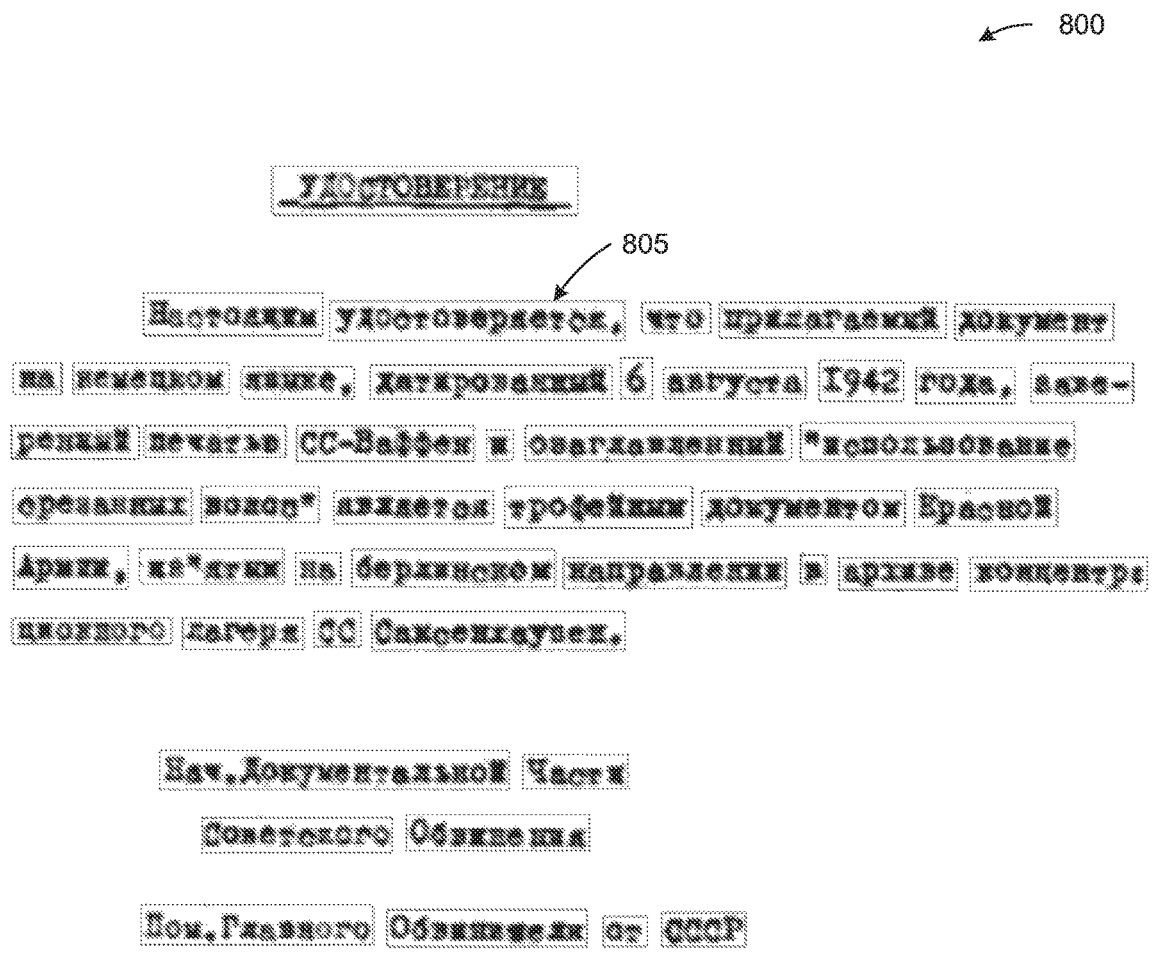
Figure 8B:
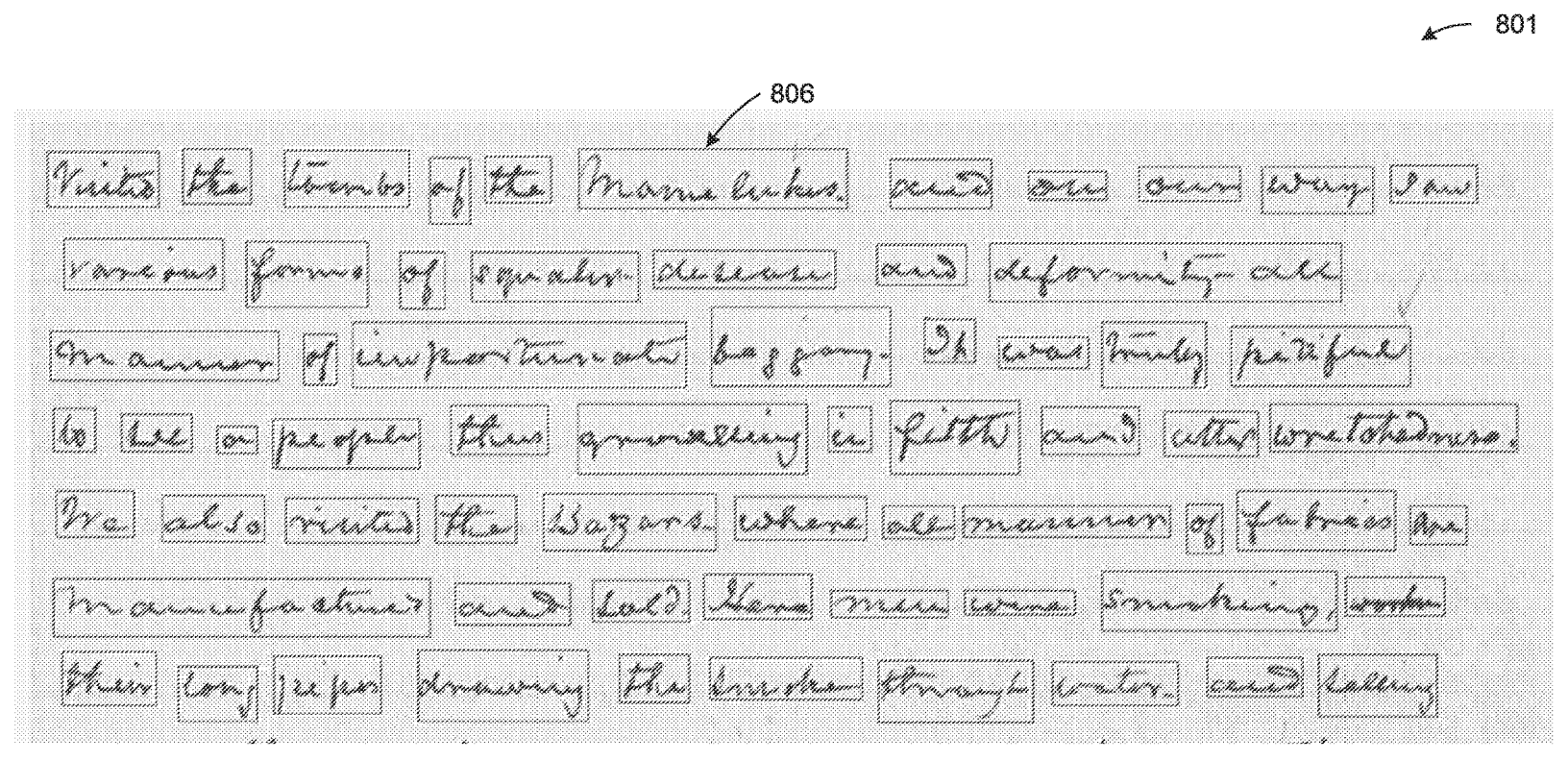
Figure 8C:
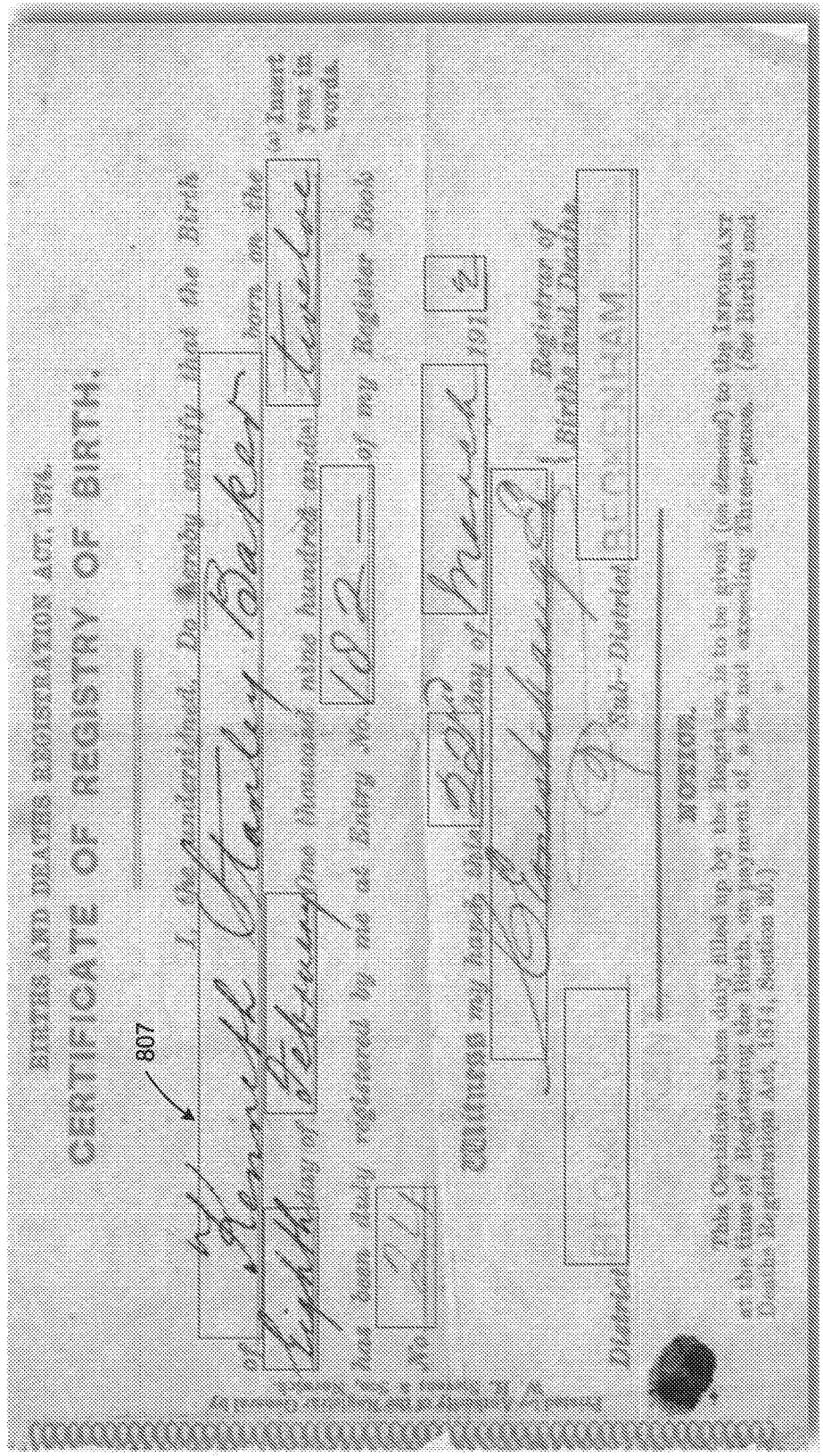

FIGS. 8A-C are illustrations of documents with shreds depicted as rectangles. FIG. 8C depicts shreds that are based on fields of a form. In the example of FIG. 8C, a shredding algorithm, such as a shredding algorithm of a method described in association with FIG. 1, executing on a computer system has identified or determined shreds of form 802 based on locations of fields of form 802, where each shred is associated with a different field of form 802. The shreds of FIG. 8C are indicated by rectangles, an example of which is rectangle 807. Rectangle 807 is associated with a NAME field of form 802, which is a Certificate of Registry of Birth form.

FIGS. 8A and 8B are illustrations of, respectively, a typed document and handwritten document with shreds depicted as rectangles. In both FIGS. 8A and 8B, a shredding algorithm, such as a shredding algorithm that determines shreds based on contiguous text strings, executing on a computer system has identified or determined shreds of documents 800 and 801 based on locations of contiguous strings of text. The shreds of FIGS. 8A and 8B are indicated by rectangles, example of which include rectangle 805 of FIG. 8A and rectangle 806 of FIG. 8B. In these examples, a shredding algorithm analyzes the document to locate contiguous text strings, and identifies a shred for each contiguous text string.

Figure 9:
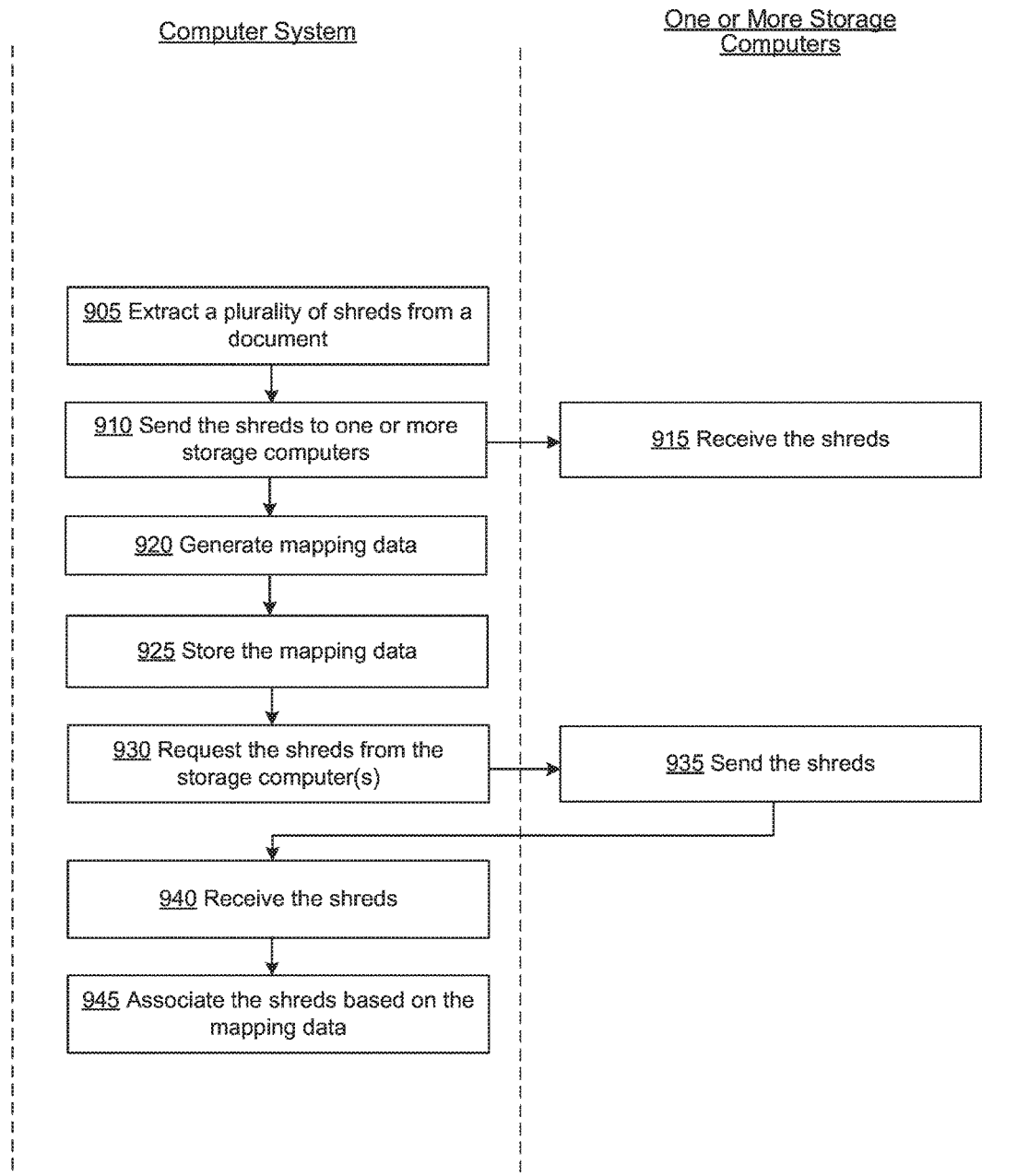
FIG. 9 is a flow diagram illustrating a process for protecting confidential information of a document based on shreds, consistent with various embodiments.

FIG. 9 is a flow diagram illustrating a process for protecting confidential information of a document based on shreds, consistent with various embodiments. At block 905, a computer system extracts a plurality of shreds from a document. The document can be an image file, with a format such as JPEG (Joint Photographic Experts Group), JFIF (JPEG File Interchange Format), EXIF (Exchangeable image file format), TIFF (Tagged Image File Format), GIF (Graphics Interchange Format), BMP (Windows bitmap), PNG (Portable Network Graphics), or a raster format, among others. The plurality of shreds can be extracted in any of various ways.

Figure 11:
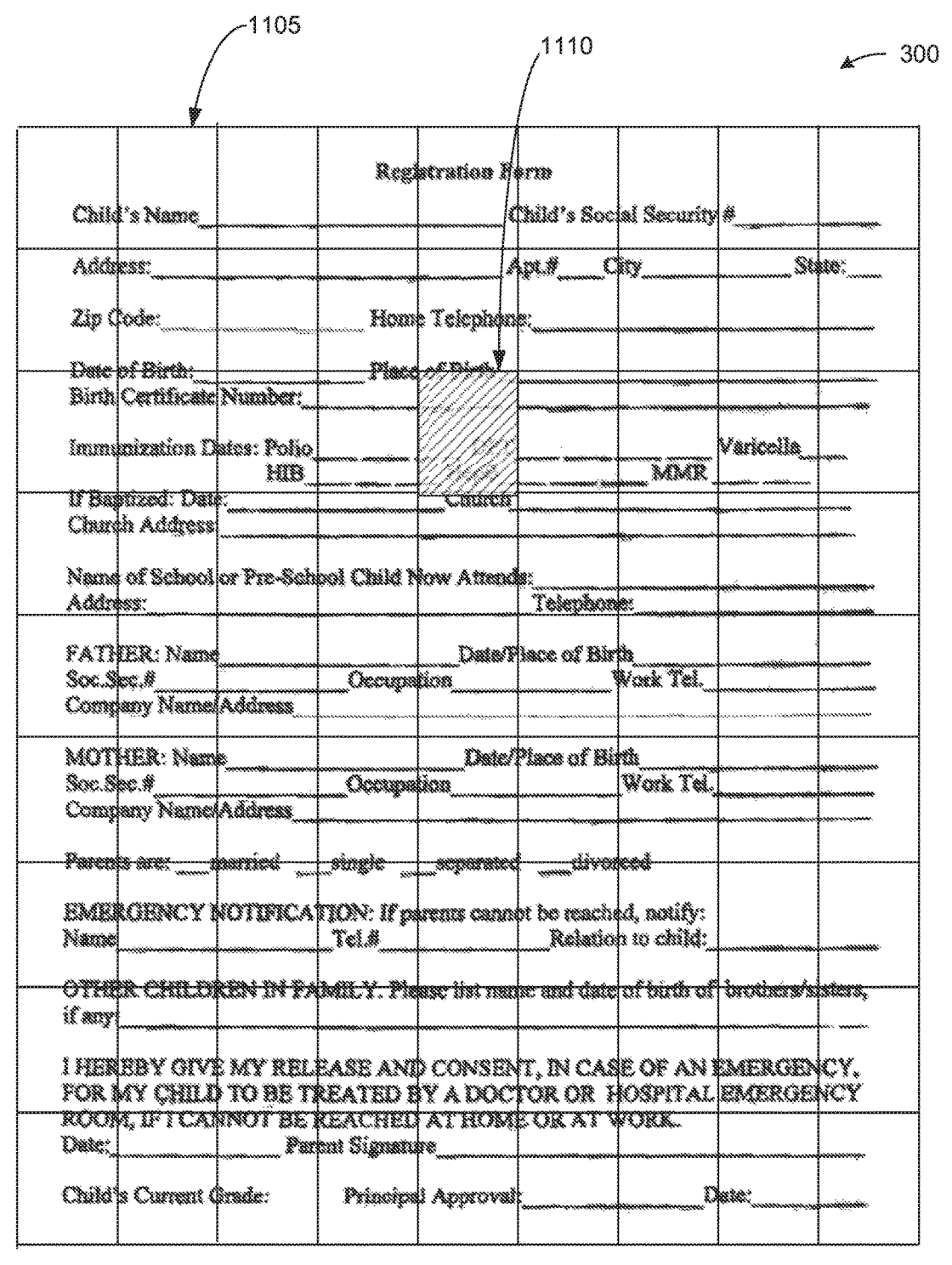

In a first shred extraction example, image 300 of FIG. 3 is conceptually divided into "portions," as is represented in FIG. 11 where image 300 has been conceptually divided into rectangles by grid 1105, each rectangle being a "portion" in this example. In various embodiments, a "portion" can be of any arbitrary shape. For example, a "portion" can be a regular shape, such as a square, rectangle, triangle, etc., can be an irregular shape, such as a heart, a drop, etc., or can be any other shape. Grid 1105 can be of any size and can be regular or irregular. For example, grid 1105 can be regular and can have a grid size that is 1×1 pixels in size, that is 100×100 pixels in size, that is 2×3 pixels in size, that is 0.1 inches×0.1 inches in size, that is 0.5 inches by 1.0 inches in size, etc. As another example, grid 1005 can be irregular with grid lines of grid 1105 being variably spaced, such as with the first and second grid lines being 1 pixel apart, the second and third grid lines being 10 pixels apart, the third and fourth grid lines being 5 pixels apart, etc.

Extracting a shred can include extracting the data of one of the "portions" of image 300, such as portion 1110, and storing data representing that portion in a shred data file. A shred data file can be an image file. A shred data file can be encrypted or unencrypted, can be compressed or uncompressed, can be changed in any way that is reversible (i.e., where the original file can be restored), etc. In this example, the grid lines of grid 1110 define the shreds, with each "portion" of image 300 between grid lines of grid 1105 defining the extent of an associated shred, and with each shred having an associated shred data file that includes information of the "portion" of image 300. In some embodiments, all image information of image 300 is included in one or more shreds, such that the original image can be reproduced based on the one or more shreds. In other embodiments, a portion less than one hundred percent of the image information of image 300 is included in all of the shreds of image 300.

In some embodiments, image 300 includes sensitive or confidential information, and the selection of the grid size is determined so that no portion of image 300, or shred of image 300, contains any information that, in isolation of the other portions or shreds of image 300, will disclose sensitive or confidential information of image 300 that is desired to be protected. For example, when filled out by a registrant, the form of image 300 could include confidential information, such as the name and social security number of the father. In such as example, the name of the father by itself, or the social security number by itself, may not be confidential information, but the linkage of the social security number with the name of the father could be confidential information. In this example, if one shred of image 300 included the name of the father, and a second shred of image 300 included the social security number of the father, either shred, in isolation of the other shreds of image 300, would not contain the confidential information.

In some embodiments, the grid size(s) of grid 1105 are determined so that no shred of image 300 includes information that, in isolation of the other shreds of image 300, will disclose the confidential information that is desired to be protected. In the example of FIG. 9, the grid size can be determined based on an analysis of image 300. For example, image 300 can be analyzed by a computer system to determine the average size of text of the image. The grid size can be determined based on the analysis of image 300. For example, the grid size can be determined to be the average size of text of image 300, two times the average size of text of image 300, 0.5 times the average size of text of image 300, etc. The analysis can be based on any of various factors, such as the maximum or minimum sizes of text of image 300, based on the spacing between lines of image 300, etc.

In a second shred extraction example, image 300 of FIG. 9, which is am image of a form, is analyzed to determine fields of image 300. A computer system can perform a method described in associated with FIGS. 1A-D to determine fields of image 300. Once a field is determined, the computer system can extract a shred that corresponds to the field from image 300 (block 905). In some embodiments, the process of extracting a shred from image 300 leaves image 300 unmodified, and the shred contains image information copied or derived from a portion of image 300 that corresponds to the field that corresponds to the shred. In other embodiments, the process of extracting a shred from image 300 causes image 300 to be modified, such as by deleting data from image 300 from which data of the shred was copied or derived.

In a third shred extraction example, shreds are to be extracted from an image of a filled out version of the form of image 300, the filled out version of the form referred to for this example as the "completed form." Prior to extracting shreds from the image of the completed form, a process of the description of FIGS. 1A-D was run on image 300, and a template form based on image 300, referred to as the image 300 template form, as well as the locations of fields of image 300 that were determined while running the process, were added to the library of form templates. The computer system accesses the library of form templates and matches the completed form to the image 300 template form, and the computer system determines locations of fields of the completed form based on the locations of fields of image 300 that are stored in the library of form templates. The computer system extracts one or more shreds (block 905) based on the locations of fields of image 300 that are stored in the library of form templates, each shred being extracted based on one field, and each field being linked with one or more shreds.

At block 910, the computer system sends the shreds to one or more storage computers. When a storage computer receives a shred (block 915), the storage computer stores the shred at a storage device coupled to the storage computer. The computer system can send each shred to the same storage computer system to a different storage computer system (such that each of the shreds is at a different storage system), can send the shreds such that no storage computer system has more than a predetermined number of shreds of a source document, etc.

Any or all storage computers can be different from any or all other storage computers in any of various ways, can be similar to any or all other storage computers, etc. For example, any storage computer can be on a different network than any other storage computer, such as a first storage computer being on a public network while a second storage computer is on a private network. As another example, all the storage computers can be on a same public network. As yet another example, any storage computer can be at a different cloud storage system than any other storage computer system, such as a first storage system being at a first cloud storage system (e.g., Amazon Web Services) while a second storage system is at a second cloud storage system (e.g., Google Cloud Platform).

In the example of FIG. 9, when a shred is stored at a storage computer at a private network, or at a storage computer at a private cloud storage system, the shred is protected from access by unauthorized users, such as by one or more security mechanisms that obstruct access to the shred. The security mechanism(s) can include, for example, a firewall that prevents or obstructs access by unauthorized users, software running at a storage computer that prevents or obstructs access to the shred by unauthorized users, network security running at a communication network (e.g., network security of a private or public network), etc. In the example of FIG. 9, an unauthorized user is a user who is not authorized to access confidential information of the document from which the shreds are derived, and an authorized user is a user who is authorized to access the confidential information. When a shred is stored at a public cloud system, the shred can be accessible to both authorized and unauthorized users. In embodiments where the shreds are files, the names of the files can be randomly generated, can be semi-random names, etc.

At block 920, the computer system generates mapping data. In some embodiments, the mapping data associates each shred with the document from which the shred was derived (which can be referred to as the "source document" for the shred), and the document may be retained at the computer system. In some embodiments, the mapping data associates each shred with the other shreds that were derived from the same document, and the document may be deleted from the computer system. A shred, which can be an image file, can be associated with the document from which the shred was derived by being linked to the document via the mapping data, which can comprise one or more databases, one or more data structures, a combination of one or more databases and one or more data structures, or any other suitable mechanism or combinations of suitable mechanisms. Two or more shreds that were derived from the same document can be linked with each other via the mapping data. When the shreds are files, the mapping data can further include the names of the files.

The mapping data can additionally include, for each shred, information as to the location of the storage computer at which a shreds is stored, or the location of the shred at the computer. In an example, the mapping data includes an Internet Protocol (IP) address, or an Hypertext Transfer Protocol (http) address, of each storage computer at which any of the shreds is stored. In this example, the storage computer(s) at which the shreds are stored each includes a file system, and the mapping data further includes information that enables each shred to be located via the file system of the storage computer at which the shred is stored, which in this example is the directory path to the shred, and the file name of the shred.

In some embodiments where the shreds of a source document, in combination, comprise the entire source document, the source document can be reproduced in its entirety based on the shreds and the mapping data. In these embodiments, the mapping data can include information as to how to piece the information from the shreds together to reproduce the source document. For example, in the example of FIG. 11, grid 1105 can define the shreds of image 300, and the shreds can be extracted such that image 300 can be reproduced based on the shreds. In other words, the sum total of the image data of all of the shreds includes all the image data of image 300. The mapping data can further include information as to how to locate each shred to reproduce the source document.

In an example, the mapping data includes, for each shred, a coordinate at which the shred can be placed in order to reproduce the source document. When the first shred is placed at its associated placement coordinate, the second shred is placed at its associated placement coordinate, . . . , and the last shred is placed at its associated placement coordinate, the resulting image reproduces the source document.

In some embodiments, the shreds comprise a portion of the source document less than the entire source document. For example, when the source document is a form, and the process of FIGS. 1A-D has been utilized the locate the fields of the form (or the form template), the shreds can be the fields of the form, and the shreds, in combination, can comprise a portion of the source document which is less than the entirety of the source document. In such an example, the mapping data can include information as to which field each of the shreds is mapped, such as shred 1 is mapped to field 1, shred 2 is mapped to field 2, etc. Alternately, the mapping data can include information as to where each shred is located on the source document, such as shred 1 is located at coordinate (x1, y1), shred 2 is located at coordinate (x2, y2), etc. The mapping data can include any other type of information that enables a selected shred to be mapped to its associated field.

At block 925, the computer system stores the mapping data. In order to protect the confidential information of the source document, the computer system can store the mapping data at any storage device that is accessible to an authorized user via the computer system, and that is not accessible to unauthorized users. Further, the mapping data can be encrypted, can be protected by one or more other security mechanisms, etc. For example, the computer system can store the mapping data at a storage device at the computer system, can store the mapping data at a server of a private network that is accessible to the authorized user via the computer system, can store the mapping data at a storage device at a server of a private cloud storage system that is accessible to the authorized user via the computer system, etc. Further, the mapping data can be made unreadable to unauthorized users, such as by being encrypted prior to being stored.

When each shred of the source document contains only information that, in isolation of other shreds of the source document, will not disclose the confidential information of the source document, then even when the shreds of the source document are stored so as to be accessible to unauthorized users, the unauthorized users are not able to access the confidential information of the source document based on the shreds. This is because the unauthorized user is obstructed from accessing the mapping data, and without the mapping data an unauthorized user is obstructed from locating and associating the shreds to enable the confidential information to be accessed. It is practically impossible, without the mapping data, for an unauthorized user to locate the shreds of the source document among the vast amount of data available via the Internet, which, according to some estimates, is approximately 1.2 million terabytes of data. For all practical purposes, it is essentially impossible for an unauthorized user to know, without the mapping data, which of the vast amount of data available to the unauthorized user via the Internet contains the shreds of the source document.

At block 930, the computer system requests the shreds from the one or more storage systems. The computer system accesses the mapping data that was stored at block 925 to determine at which storage computer(s) the shreds are stored. When the mapping data is encrypted or otherwise encoded in such a way that only authorized users can read it, the computer system decrypts or otherwise decodes the mapping data so as to be readable by the authorized user. The authorized user may need to provide an encryption key, or some other code, to enable the computer system to make the mapping data readable. When the mapping data is readable, the computer system accesses the mapping data to determine at which storage computer(s) the shreds are stored, and sends one or more messages to each of the storage systems. For example, the computer system can use the IP or http address obtained from the mapping data to determine where to send the message(s). The computer system can read the mapping data to determine the location of the shred at the storage computer, and can send that information with the message(s). For example, the message(s) can include a copy command, and can include the directory path and file name of the shred at the storage computer, which causes and enables the storage computer to send the shred to the computer system.

At block 945, the computer system associates the shreds based on the mapping data. In an example, the shreds are portions of an image file that includes an image of a photo, and the combination of all shreds includes all the image data of the photo. In this example, the mapping data includes, for each shred, a coordinate at which the shred can be placed, as well as an orientation of the shred when placed, in order to generate an image file that includes the image of the photo. The computer system generates an image file that includes the image of the photo based on the placement and orientation data of each shred, and the data of the shreds.

Figure 10:
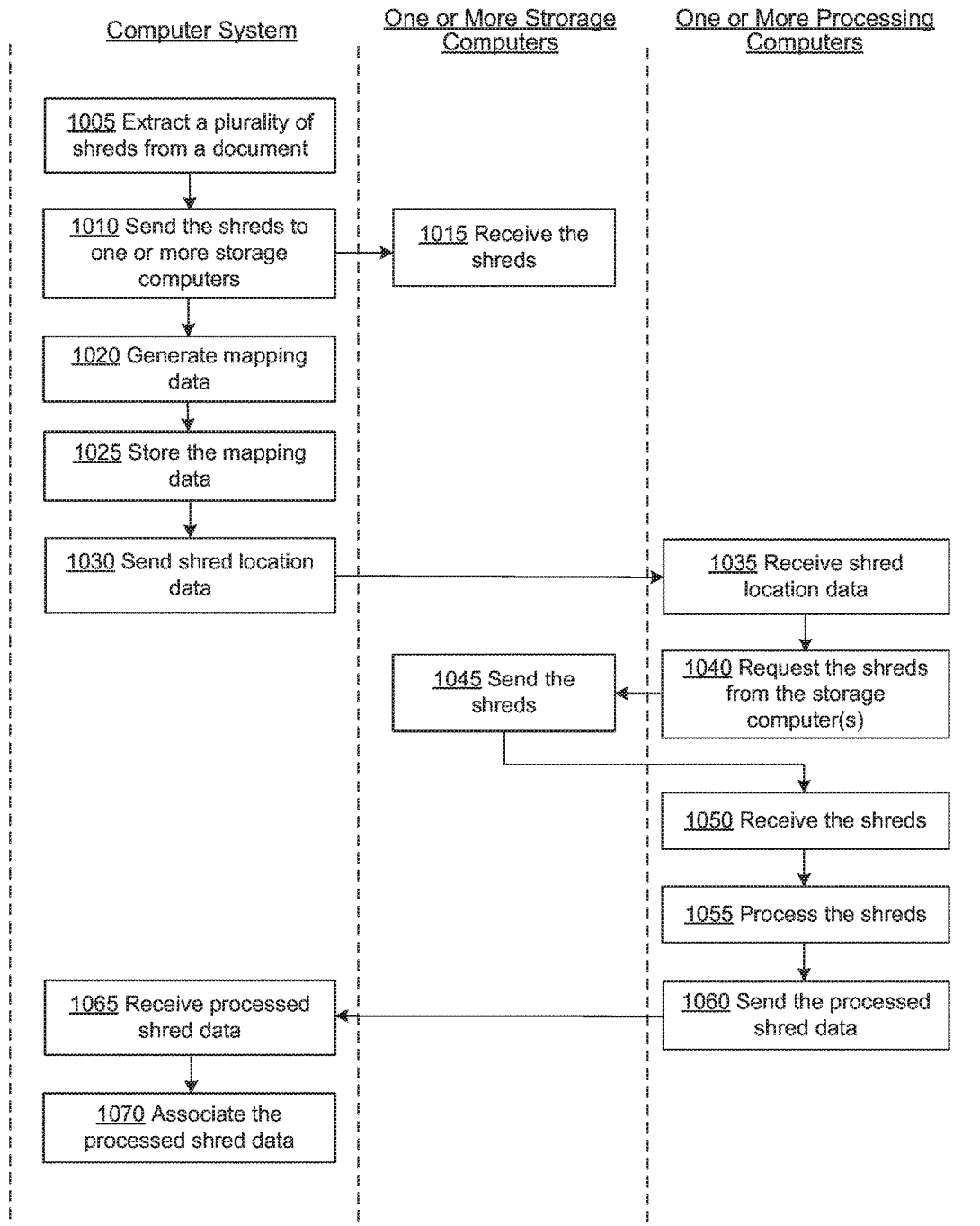
FIG. 10 is a flow diagram illustrating a process for enabling unprotected access to shreds of a document while still protecting confidential information of the document, consistent with various embodiments.

FIG. 10 is a flow diagram illustrating a process for enabling resources to process shreds while protecting confidential information of a document from which the shreds were derived, consistent with various embodiments. In the example of FIG. 10, blocks 1005-1025 are, respectively, substantially similar to blocks 9005-9025 of FIG. 9. At block 1030, a computer system sends shred location data to one or more processing computers. Block 1030 can occur after block 1020 and without block 1025 occurring. When block 1025 occurs before block 1030, the computer system can access the mapping data that was stored at block 1025 to determine at which storage computer(s) the shreds are stored.

When the mapping data is encrypted or otherwise encoded in such a way that only authorized users can read it, the computer system decrypts or otherwise decodes the mapping data so as to be readable by the authorized user. The authorized user may need to provide an encryption key, or some other code, to enable the computer system to make the mapping data readable. When the mapping data is readable, the computer system accesses the mapping data to determine at which storage computer(s) the shreds are stored, and to determine the locations of the shreds at the storage computer(s). When block 1025 does not occur, or occurs after block 1030, or when a portion of the mapping data resides in memory of the computer system, the computer system can access the memory to obtain some or all of the needed mapping data.

In an example, the computer system accesses the mapping file or memory of the computer system to obtain an IP or http address of the one or more storage systems at which the shreds are stored. The computer system further obtains the locations of the shreds at the one or more storage computers. The computer system sends the shred location data to one or more processing computers (block 1030) to enable the processing computer(s) to obtain the shreds. In this example, the shred location data includes the IP or http address of the one or more storage systems at which the shreds are stored, and the locations of the shreds at the one or more storage computers, which in this example are, for each shred, the directory path to the shred and the file name of the shred. At block 1035, the one or more processing computers receives the shred location data.

Blocks 1040-1050 are, respectively, substantially similar to blocks 930-940 of FIG. 9, except that the one or more processing computers execute blocks 1040 and 1050 rather than the computer system. At block 1055, the one or more processing computers process the shreds. Utilizing existing technologies, enabling an unauthorized user to process electronic data that includes confidential information, such as enabling an unauthorized user to perform manual OCR on a scanned copy of a medical record, can involve taking actions to transition the unauthorized user to an authorized user, and taking additional actions to enable the newly authorized user to technologically access the electronic data. For example, the unauthorized user may need to sign a legal agreement, such as a confidentiality agreement, where he agrees to keep confidential and to protect the confidential information of the electronic data. Further, with existing technologies, the electronic data that includes the confidential information may need to be protected from access by unauthorized users, so the electronic data may only be accessible to those that have, in addition to permission to access the confidential information, technological access to the electronic data, as well as the technological ability to view the confidential information of the electronic data.

For example, an image file that includes a photo of a completed medical form may be protected from access by unauthorized users by being encrypted and stored at a private network. In order to technologically gain access to the image file, a newly authorized user may need to gain access to the private network, such as by having an account created at the private network, modifying access permissions of the image file to grant the newly created account read access to the image file, and installing virtual private network (VPN) software at a computer that the newly authorized used can use to run VPN in order to gain access to the private network. With such actions completed, the newly authorized user will be able to copy the image file to his computer. However, since the file is encrypted, in order to be able to view the confidential information of the image file, the newly authorized user also needs access to a key or code that enables the newly authorized use to decrypt the image file. As this demonstrates, enabling an unauthorized user to process electronic data that includes confidential information can be a daunting task, both legally and technologically.

Utilizing the disclosed technology, enabling an unauthorized user to process electronic data that includes confidential information can be greatly simplified. When the electronic data is electronically shredded such that each shred includes information that does not, in isolation of the other shreds, disclose confidential information of the electronic data, or such that a subset of the shreds does not, in isolation of the remaining shreds, disclose confidential information, an unauthorized user can access and view the information of the shred, or the subset of shreds, without gaining access to the confidential information. As a result, the shreds do not need to be protected from access by unauthorized users, greatly simplifying the task of enabling an unauthorized user to process electronic data that includes confidential information. The disclosed technology is not limited to the specific kinds of examples illustrated in the figures or described in the specification, but can be applied to any of a variety of types of electronic data containing any of a variety of types of data.

In a first example where the electronic data is an image file containing a scanned image of a filled out medical record form, and where the processing of block 1055 includes performing manual OCR on the filled out fields of the form, when the image file is shredded, each shred of this example includes the information of one field of the form. The information of any single field of the medical record form does not include confidential information, which in this example is that the patient was diagnosed with HIV. Neither viewing the patent's name without knowledge of what he was diagnosed with, nor viewing the diagnosis of HIV without knowledge of who was diagnosed, nor viewing any other field, such as the patient's address, compromises the confidential information. In this example, each shred can be manually OCRed by different unauthorized persons without any risk of disclosing the confidential information to any unauthorized person. Further, with appropriate grouping of the shreds, a person can manually OCR a group of shreds without compromising the confidential information. For example, a group consisting of the shred that includes the patient's name field, and the shred that includes the patient's address, can be manually OCR'ed without compromising the confidential information that the patient was diagnosed with HIV.

Processing the shreds (block 1055) can include a number of actions. In this example, the goal of processing the shreds is to OCR each shred. Processing a shred includes a selected processing computer performing automated OCR on the shred. When automated OCR is successful, or is successful at a predetermined confidence level, the result of OCR is saved, such as in a file, database, data structure, etc., where the result is referred to as processed shred data. For example, when a shred includes an image of a handwritten name of a person, the result of OCR is the characters of the handwritten name in a form that is easily processed by a computer, such as in American Standard Code for Information Interchange (ASCII) format. When automated OCR is not successful, or is successful but with less than a predetermined level of confidence, the shred is queued for manual OCR. An appropriate human resource is located, such as via crowd-sourcing, to perform manual OCR of the shred. The human resource views an image of the shred, performs OCR, and inputs the characters of the handwritten name into a computer, where the OCR data input by the human resource is referred to as the processed shred data. This process for OCRing the shreds is followed for each shred, with the result that each shred is either automatically or manually OCRed, and with the electronically saved results of OCR being processed shred data.

Utilizing the disclosed technology, enabling non-secure resources, such as computers from a publicly accessible cloud compute resources, to process the electronic data can be greatly simplified. Once again, because the shreds can be stored in a non-secure fashion, the shreds can be easily accessed by many computers without any special setup. In a second example, the electronic data is a photo, such as a photo of an FBI informant, the shreds include data of portions of the photo, and processing the electronic data includes performing image enhancement of the photo. In this example, a compute intensive task needs to be run on the photo and it is desirable to parallelize the job so that it can be run on multiple computers. In such a case, once the photo is shredded and the shreds stored in, e.g., a publicly accessible cloud storage system, the shreds of the photo can be sent to computers of a cloud compute pool to enable the cloud computers to process the shreds (block 1055), in this example for image enhancement.

At block 1060, the one or more processing computers sends the processed shred data to the computer system, where the processed shred data is received (block 1065). At block 1070, the computer system associates the processed shred data based on the mapping data. Returning to the second example of block 1055, the shreds are portions of an image file that includes an image of a photo, the combination of all shreds includes all the image data of the photo, and the processed shred data is image data where the image of each of the original shreds has been enhanced. In this example, the mapping data includes, for each shred, a coordinate at which the shred can be placed, as well as an orientation of the shred when placed, in order to generate an image file that includes the image of the photo. The computer system generates an image file that includes an enhanced image of the photo based on the placement and orientation data of each shred, and based on the processed shred data. In other words, the computer system generates an image by placing the processed shred data according to the placement and orientation data of the mapping file in order to generate an enhanced version of the original photo.

Returning to the first example of block 1055, in this example the shreds include images of fields of the filled out medical record form, with each shred including an image of at least a portion of a field. Further, the combination of all the image data of the shreds includes image data of a portion less than one hundred person of the image data of the medical record form, and also includes at least all of the image data of the fields of the filled out medical record form. The processed shred data of this example includes the results of the OCR that was performed at block 1055. For this example, the computer system associates the processed shred data (block 1070) by associating the results of OCR with the fields of the medical record form. A database entry was earlier created for the filled out medical record form. The first shred includes an image of the NAME field of the filled out form, and the results of OCR (i.e., the processed shred data for the first shred) include the characters of the name of the patient as entered in the NAME field by the patient. The second shred includes an image of the ADDRESS field of the form, and the results of OCR (i.e., the processed shred data for the second shred) include the characters of the address of the patient, as entered in the ADDRESS field by the patient. When the computer system associates the processed shred data (block 1070) for this example, the computer system inputs the results of OCR of the first shred in a NAME field of a database, and inputs the results of OCR of the second shred in an ADDRESS field of a database.

Figure 12:
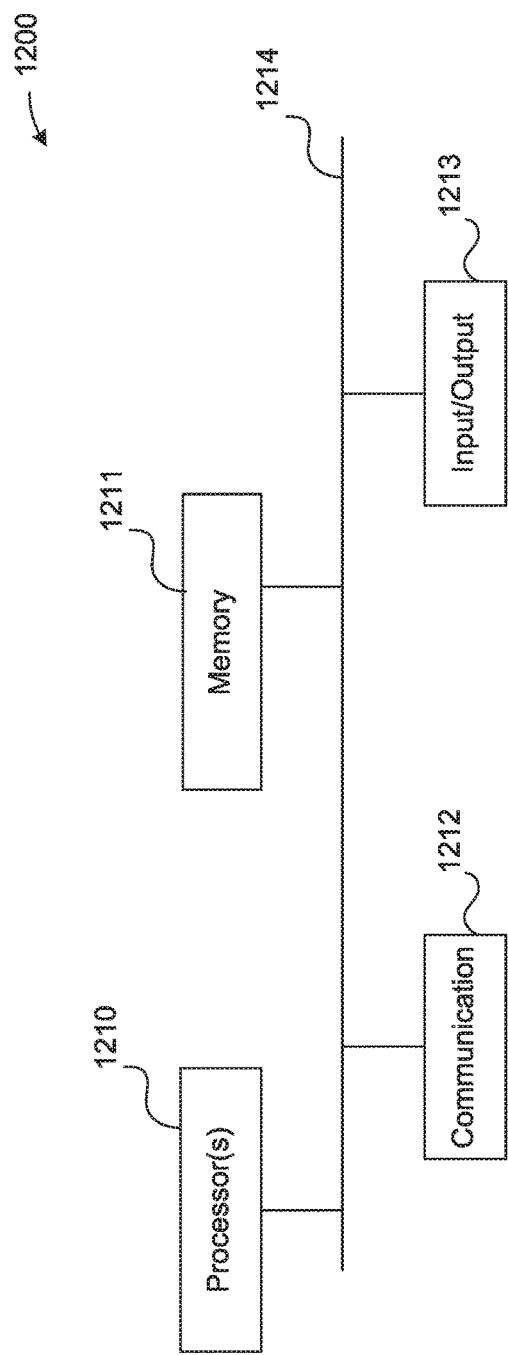
FIG. 12 is a block diagram illustrating an example of a processing system in which at least some operations described herein can be implemented, consistent with various embodiments.

FIG. 12 is a high-level block diagram showing an example of a processing device 1200 that can represent a system to run any of the methods/algorithms described above, and can represent, for example, the computer system, the one or more storage computers, or the one or more processing computers of FIG. 10 or 11. A system may include two or more processing devices such as represented in FIG. 12, which may be coupled to each other via a network or multiple networks. A network can be referred to as a communication network.

In the illustrated embodiment, the processing device 1200 includes one or more processors 1210, memory 1211, a communication device 1212, and one or more input/output (I/O) devices 1213, all coupled to each other through an interconnect 1214. The interconnect 1214 may be or include one or more conductive traces, buses, point-to-point connections, controllers, adapters and/or other conventional connection devices. Each processor 1210 may be or include, for example, one or more general-purpose programmable microprocessors or microprocessor cores, microcontrollers, application specific integrated circuits (ASICs), programmable gate arrays, or the like, or a combination of such devices. The processor(s) 1210 control the overall operation of the processing device 1200. Memory 1211 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1211 may store data and instructions that configure the processor(s) 1210 to execute operations in accordance with the techniques described above. The communication device 1212 may be or include, for example, an Ethernet adapter, cable modem, Wi-Fi adapter, cellular transceiver, Bluetooth transceiver, or the like, or a combination thereof. Depending on the specific nature and purpose of the processing device 1200, the I/O devices 1213 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed:

1. A method comprising:
   removing, by a computer system, a plurality of shreds from an image of a document, wherein a first shred includes handwritten text;
   generating mapping data, by the computer system, that associates the plurality of shreds with a respective original location on the document for each respective shred of the plurality of shreds;
   determining that an OCR process performed on the first shred has an unsuccessful level of confidence;
   in response to said determining, displaying, by the computer system, the first shred and no other portion of the document to a first user; and
   receiving, by the computer system from the first user, a text string that is data that is the handwritten text of the first shred.

2. The method of claim 1,
   wherein the document includes information that a patient is diagnosed with a disease,
   wherein the handwritten text of the first shred includes at least a portion of a name of the patient, and a second shred includes at least a portion of a name of the disease, and wherein the mapping data includes metadata that associates the name of the first shred with the disease of the second shred.

3. The method of claim 1,
wherein the first user is a member of a public network computing system, and
wherein access to the mapping data is restricted to a private network that the first user is not associated with.

4. The method of claim 1,
wherein the plurality of shreds are associated with each other.

5. The method of claim 1,
wherein each respective original location is associated, respectively, with a different selected field of the document.

6. A method of crowdsourcing document digitization without revealing document content comprising:
removing, by a computer system, a first plurality of shreds from an image of a first filled in form, wherein a first shred includes handwritten text and is associated with a known field on the filled in form;
generating mapping data, by the computer system, that associates the first plurality of shreds with a respective original location on the first filled in form for each respective shred of the first plurality of shreds;
transmitting, by the computer system, the first plurality of shreds including the first shred to a cloud-based reading resource, wherein a first user of the cloud-based reading resource that views the first shred is unable to view another portion of the first filled in form;
receiving, by the computer system from the first user, a first text string that represents the handwritten text of the first shred; and
inserting, by the computer system, the first text string of the first shred into a database at a location associated with the first known field on the first filled in form.

7. The method of claim 6, the method further comprising:
performing optical character recognition, by a first computer, on the first shred of the first plurality of shreds; and
determining that the optical character recognition was not successful.

8. The method of claim 6, further comprising:
transmitting, by the computer system, a second plurality of shreds including a second shred associated with a second filled in form to the cloud-based reading resource, wherein the first user of the cloud-based reading resource that views the second shred is unable to view another portion of the second filled in form;
receiving, by the computer system from the first user, a second text string that represents the additional handwritten text of the second shred; and
inserting, by the computer system, the second text string of the first shred into the database as associated with the second filled in form.

9. The method of claim 6,
wherein the first filled in form and the second filled in form are instances of the same form template, and the first shred and the second shred correspond to a same known field.

10. The method of claim 7,
wherein the removing of the plurality of shreds is accomplished by a shredding module,
wherein the performing of the optical character recognition is accomplished by an optical character recognition module,
wherein the shredding module and the optical character recognition module execute on different computers.

11. The method of claim 6, wherein the first user is prevented from viewing more than a single shred from each of a plurality of filled in forms.

12. The method of claim 6,
wherein the cloud-based reading resource is part of the computer system.

13. The method of claim 7, wherein the optical character recognition is based on a computer vision algorithm that includes machine learning techniques.

14. The method of claim 13, wherein the first text string as associated with the first shred is used to improve the machine learning techniques of the optical character recognition.

15. A system comprising:
a hardware processor configured to implement:
a shredding module configured to remove a plurality of shreds from an image of a document, wherein a first shred includes handwritten text; and
a mapping module configured to generate mapping data that associates the plurality of shreds with a respective original location on the document for each respective shred of the plurality of shreds; and
a networking interface coupled to the processor configured to transmit the first shred and no other portion of the document to a first user device configured to display the first shred, and receive from the first user, a text string that is data that is the handwritten text of the first shred, wherein said transmitting and displaying is performed in response to a determination that an OCR process performed on the first shred has an unsuccessful level of confidence.

16. The system of claim 15, wherein the document is an image of a form, and further comprising:
an optical character recognition module configured to determine text content of the first shred, wherein the optical character recognition is based on a computer vision algorithm that includes machine learning techniques.

17. The system of claim 15,
wherein the document is a filled in form and the first shred includes at least a portion of a field on the form.

18. The system of claim 17, further comprising:
a database supported by a memory configured to store the text string of the first shred at a location associated with the field on the form on the filled in form.

19. The system of claim 15,
wherein the document is any of a document that includes machine printed text, a document that includes handwritten text, a document that includes machine printed and handwritten text, a document that includes a drawing, or document that includes a photo.

* * * * *